(12) United States Patent
Ikeyama et al.

(10) Patent No.: US 7,817,193 B2
(45) Date of Patent: Oct. 19, 2010

(54) IMAGE PICKUP APPARATUS AND IMAGE PICKUP METHOD TO DISPLAY OR RECORD IMAGES PICKED UP AT HIGH RATE IN REAL TIME

(75) Inventors: Hiromasa Ikeyama, Tokyo (JP);
Kazushige Takahashi, Kanagawa (JP);
Manabu Hara, Kanagawa (JP);
Yoshiaki Nishide, Kanagawa (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 11/282,619

(22) Filed: Nov. 21, 2005

(65) Prior Publication Data

US 2006/0132622 A1 Jun. 22, 2006

(30) Foreign Application Priority Data

Nov. 25, 2004 (JP) ............................. 2004-340766
Nov. 25, 2004 (JP) ............................. 2004-340767

(51) Int. Cl.
*H04N 5/76* (2006.01)
*H04N 5/222* (2006.01)
*H04N 7/01* (2006.01)

(52) U.S. Cl. ........................... 348/231.99; 348/333.01; 348/441

(58) Field of Classification Search .............. 348/222.1, 348/231.99, 321, 323, 333.01, 441, 459
See application file for complete search history.

(56) References Cited

U.S. PATENT DOCUMENTS

| | | | |
|---|---|---|---|
| 5,666,955 | A | 9/1997 | Kondo et al. |
| 6,791,615 | B1 * | 9/2004 | Shiomi et al. ............... 348/323 |
| 6,803,948 | B1 * | 10/2004 | Schmale .................. 348/222.1 |
| 7,015,965 | B2 * | 3/2006 | Asada et al. ................ 348/312 |
| 2001/0050722 | A1 * | 12/2001 | Tachibana ................... 348/459 |
| 2004/0081437 | A1 * | 4/2004 | Asada et al. ................ 386/131 |
| 2004/0183945 | A1 * | 9/2004 | Ochiai et al. ................ 348/441 |

FOREIGN PATENT DOCUMENTS

| | | |
|---|---|---|
| EP | 1 469 673 A1 | 10/2004 |
| EP | 1 599 035 A1 | 11/2005 |
| JP | 1-261086 | 10/1989 |
| JP | 4-323973 | 11/1992 |
| JP | 2000-125210 | 4/2000 |

(Continued)

OTHER PUBLICATIONS

Patent Abstracts of Japan, JP 2004-140687, May 13, 2004.

*Primary Examiner*—Timothy J Henn
(74) *Attorney, Agent, or Firm*—Oblon, Spivak, McClelland, Maier & Neustadt, L.L.P.

(57) ABSTRACT

An image pickup apparatus includes an image pickup device generating image signals of picked up images; a converting unit converting the image signals generated by the image pickup device to digital image signals; a memory storing the image signals obtained by the converting unit; and a memory control unit controlling writing the image signals in the memory and reading the image signals from the memory. The memory control unit assigns bands of the memory in order to simultaneously perform writing image signals in the memory and reading the image signals from the memory for displaying picked up images and/or reading the image signals from the memory for recording picked up images at different frame rates.

14 Claims, 14 Drawing Sheets

FOREIGN PATENT DOCUMENTS

| | | |
|---|---|---|
| JP | 2003-158681 | 5/2003 |
| JP | 2003-274264 | 9/2003 |
| JP | 2004-7543 | 1/2004 |
| JP | 2004-80427 | 3/2004 |
| JP | 2004-221955 | 8/2004 |
| WO | WO 03/063471 A1 | 7/2003 |
| WO | WO 2004/075538 A1 | 9/2004 |

* cited by examiner

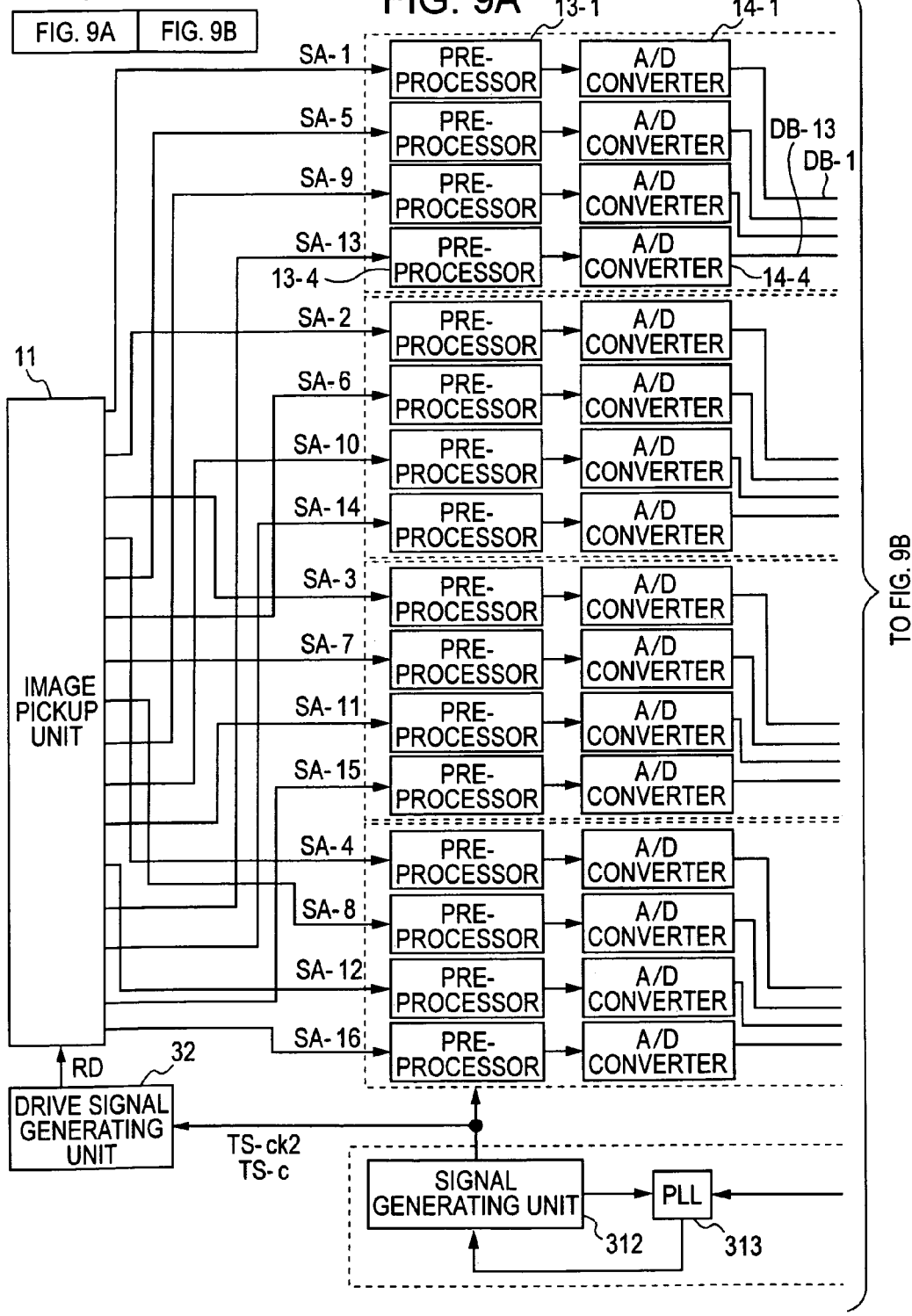

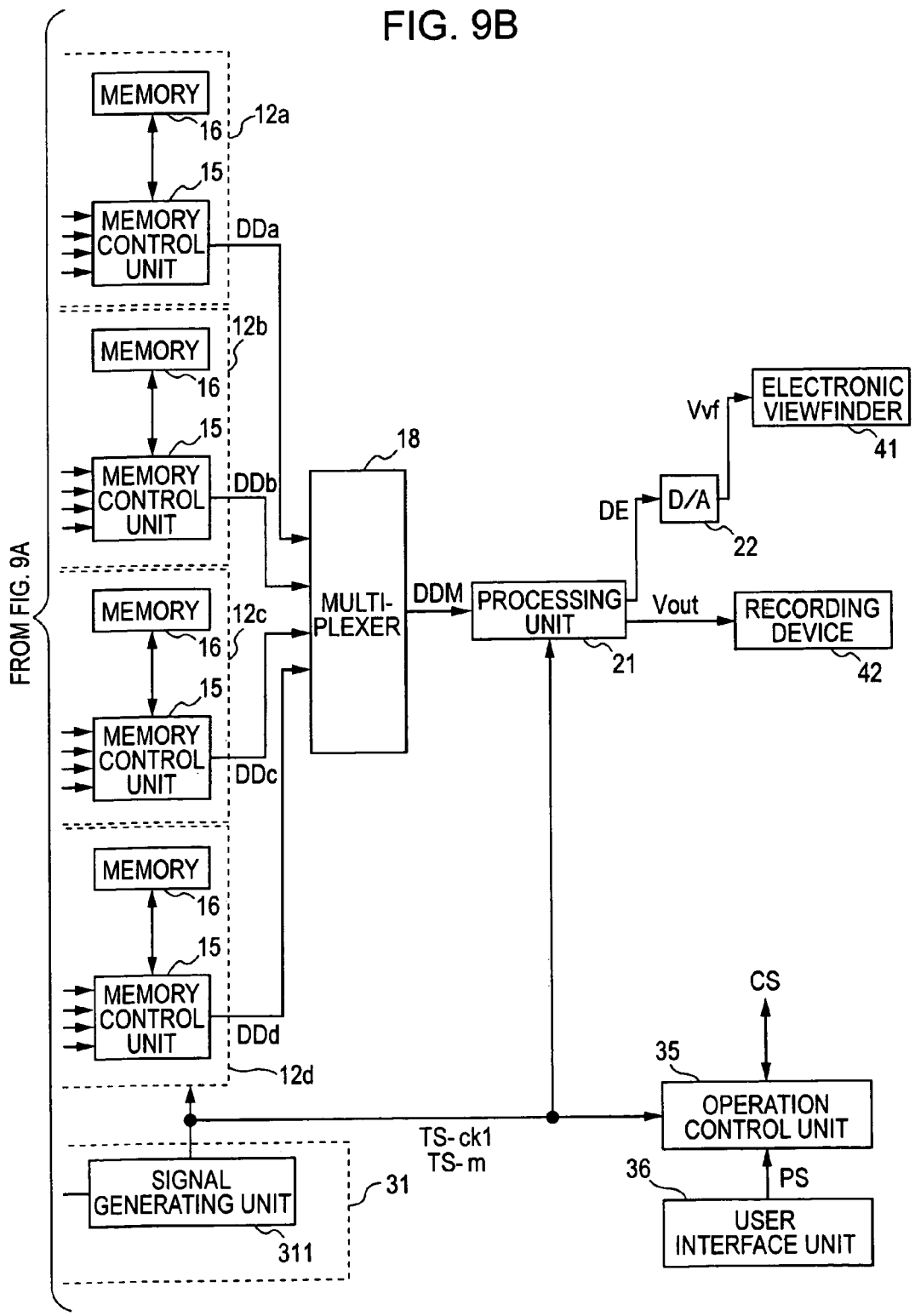

IMAGE PICKUP APPARATUS AND IMAGE PICKUP METHOD TO DISPLAY OR RECORD IMAGES PICKED UP AT HIGH RATE IN REAL TIME

CROSS REFERENCES TO RELATED APPLICATIONS

The present invention contains subject matter related to Japanese Patent Applications JP 2004-340766 and JP 2004-340767 filed in the Japanese Patent Office on Nov. 25, 2004, the entire contents of which are incorporated herein by reference.

BACKGROUND OF THE INVENTION

1. Field of the Invention

The present invention relates to an image pickup apparatus and an image pickup method. More specifically, the present invention relates to enabling to display or record images picked up at high rate in real time by assigning bands of a memory in order to simultaneously perform writing image signals in the memory and reading the image signals from the memory for displaying picked up images and/or reading the image signals from the memory for recording picked up images at different frame rates.

2. Description of the Related Art

In an image pickup apparatus, the movement of a subject can be displayed at a rate different from an actual rate by changing the frame rate of picking up an image of the subject (hereinafter this frame rate is referred to as a "pickup frame rate") in the manner described in Patent Document 1 (Japanese Unexamined Patent Application Publication No. 2000-125210). For example, if image signals obtained by picking up images at a pickup frame rate are played back at a frame rate lower than the pickup frame rate, slow-playback images, in which the movement of the subject is slower than the actual speed, can be obtained.

SUMMARY OF THE INVENTION

In a case where images are picked up by setting the pickup frame rate to higher than the recording frame rate of a recording device to record picked up images, if various camera signal processes are performed at the pickup frame rate, a signal processing circuit having a high processing ability needs to be provided in the image pickup apparatus. Such an image pickup apparatus is expensive and power consumption thereof is high. In order to avoid this problem, picked up images of a pickup frame rate are supplied to a computer apparatus through a high-speed interface (e.g., Gigabit Ether), the computer apparatus performs signal processing and generates a video signal, and then the signal is recorded in a recording medium.

However, when picked up images are supplied to the computer apparatus and then signal processing and generation of a video signal are performed therein, time is required to play back the picked up images. Therefore, the picked up images are not checked in real time.

The present invention is directed to providing an image pickup apparatus and an image pickup method enabling a user to record or check images in real time even when the images are picked up at a high rate.

According to an embodiment of the present invention, an image pickup apparatus includes: an image pickup device generating image signals of picked up images; a converting unit converting the image signals generated by the image pickup device to digital image signals; a memory storing the image signals obtained by the converting unit; and a memory control unit controlling writing the image signals in the memory and reading the image signals from the memory. The memory control unit assigns bands of the memory in order to simultaneously perform writing image signals in the memory and reading the image signals from the memory for displaying picked up images and/or reading the image signals from the memory for recording picked up images at different frame rates.

According to another embodiment of the present invention, an image pickup method includes the steps of: generating image signals of picked up images; converting the image signals generated in the generating step to digital image signals; and controlling writing the image signals obtained in the converting step in the memory and reading the image signals from the memory. The controlling step assigns bands of the memory in order to simultaneously perform writing image signals in the memory and reading the image signals from the memory for displaying picked up images and/or reading the image signals from the memory for recording picked up images at different frame rates.

In the present invention, bands of the memory are assigned so that writing digital image signals obtained by picking up images of a subject in the memory and reading the image signals from the memory for displaying the picked up images in an electronic viewfinder and/or recording the picked up images in a recording device are simultaneously performed at different frame rates. The frame rate used to write the image signal in the memory is equal to or higher than the frame rate used to read the image signal from the memory. The image signals are read from the memory at a higher frame rate than a display frame rate of displaying picked up images in an electronic viewfinder and a recording frame rate of recording the picked up images in a recording medium. By using the image signals read at the higher frame rate, a display signal of the display frame rate and a video signal of the recording frame rate are generated.

According to an embodiment of the present invention, bands of the memory are assigned so that writing digital image signals obtained by picking up images of a subject in the memory and reading the image signals from the memory for displaying the picked up images in an electronic viewfinder and/or recording the picked up images in a recording device are simultaneously performed at different frame rates. Accordingly, picked up images can be recorded or checked in real time at a different frame rate while the images are being picked up at a high rate.

According to an embodiment of the present invention, there is provided a plurality of converting units (steps) converting the frame rate of image signals by controlling writing the image signals in a memory and reading the image signals written in the memory. The image signals of picked up images are assigned to the plurality of converting units (steps) so that the image signals are arranged in order of sequential pixels when the image signals are read in the plurality of converting units (steps). Therefore, image signals of sequential pixels can be obtained by reading the image signals in each converting unit (step). In this case, the rate of reading the image signals from the memory can be decreased compared to a case where image signals of a predetermined number of pixels are assigned to the plurality of converting units (steps) in order of pixels. Accordingly, the picked up images stored in the memory can be easily read at a desired frame rate. Further, switching among the converting units (steps) where image signals are to be read is not required. Pixel signals of a plurality of sequential pixels are output in parallel as image signals and the image signals are assigned. With this configuration, even if the pickup frame rate increases by outputting pixel signals of a plurality of sequential pixels in parallel, the frame rate can be easily changed because image signals of a plurality of sequential pixels can be obtained when the image signals are read in each converting unit (step).

The frame rate used to write the image signal in the memory is equal to or higher than the frame rate used to read the image signal from the memory. Therefore, even if image signals written in the memory are read while the image signals are being written in the memory, picked up images can be correctly read.

The image signals written in the memory are read at a higher frame rate than a display frame rate of displaying picked up images and a recording frame rate of recording the picked up images. By using the image signals read at the higher frame rate, a display signal of the display frame rate and a video signal of the recording frame rate are generated. Therefore, a display signal and a video signal of a desired frame rate which are filtered by using image signals of a plurality of frames can be obtained.

BRIEF DESCRIPTION OF THE DRAWINGS

FIG. 9 is a block diagram showing the configuration of an image pickup apparatus according to a second embodiment of the present invention;

DESCRIPTION OF THE PREFERRED EMBODIMENTS

First Embodiment

Figure 1:
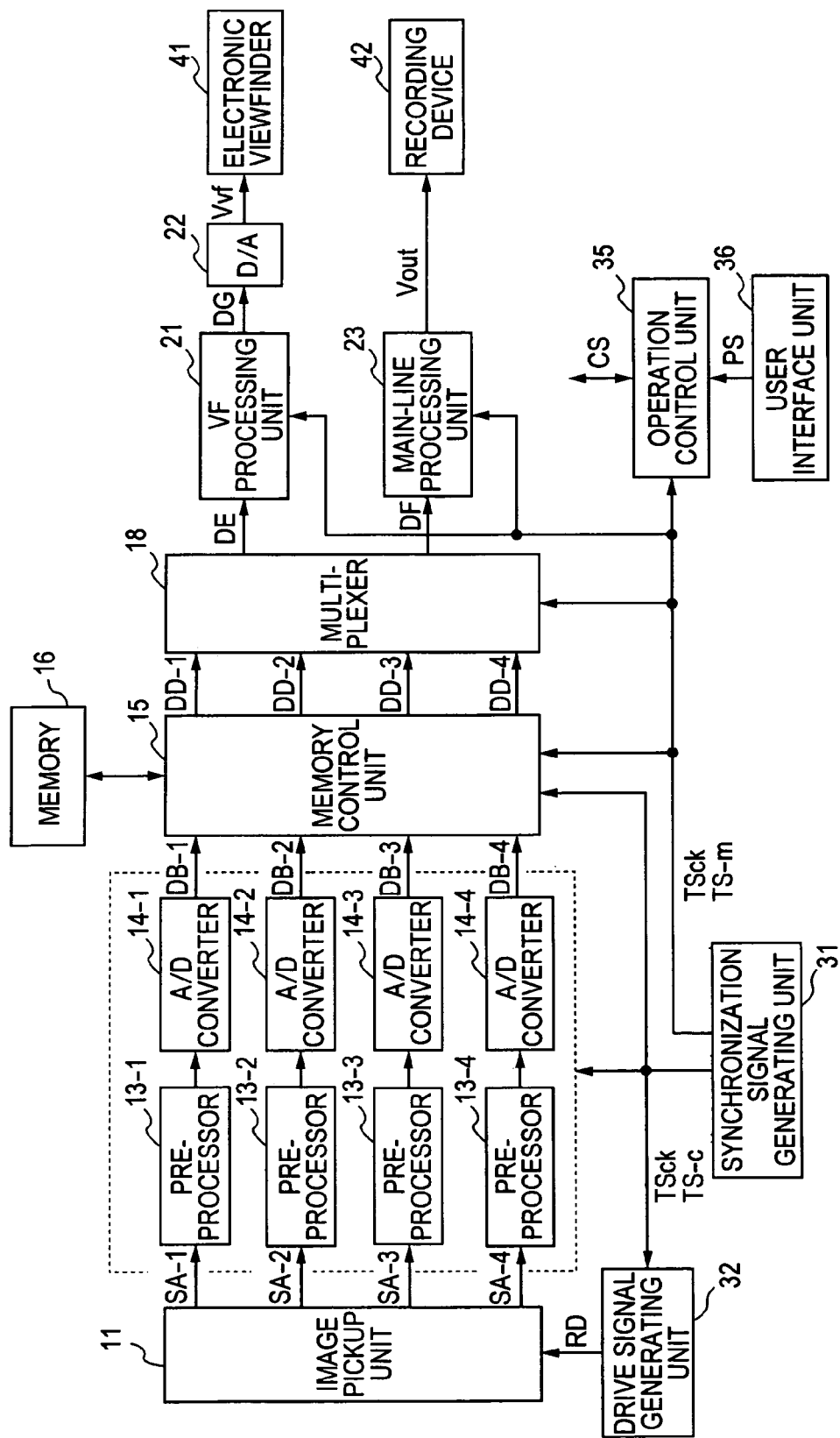
FIG. 1 is a block diagram showing an example of the configuration of an image pickup apparatus according to a first embodiment of the present invention.

Hereinafter, a first embodiment of the present invention is described with reference to the drawings. FIG. 1 is a block diagram showing the configuration of an image pickup apparatus 10.

An image pickup unit 11 generates image signals of a pickup frame rate by using a CMOS or CCD solid state image pickup device. The pickup frame rate is equal to or higher than a recording frame rate used to record picked up images in a recording medium and a display frame rate used to display images in a viewfinder.

Figure 2:
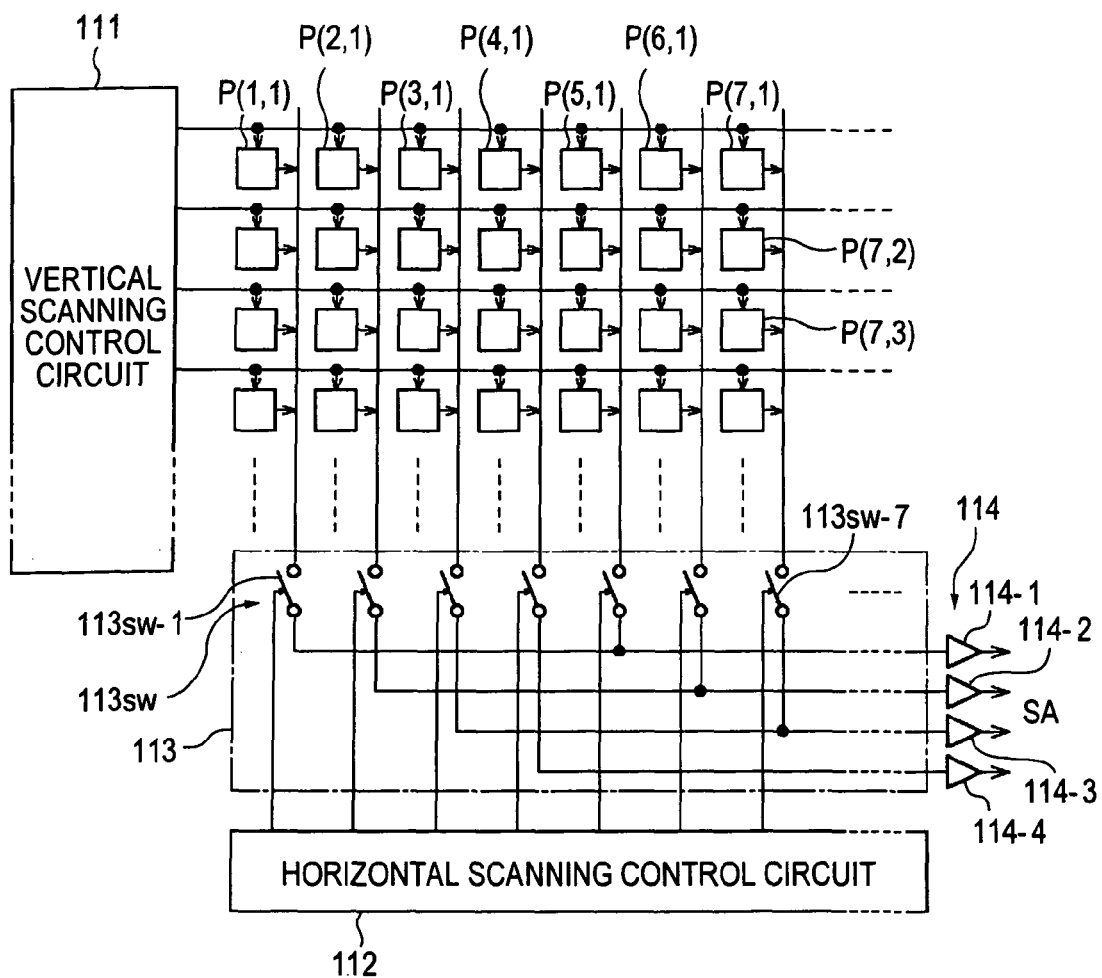
FIG. 2 is a block diagram showing an example of the configuration of an image pickup unit according to the first embodiment.

FIG. 2 is a block diagram showing an example of the configuration of the image pickup unit 11 using a CMOS solid state image pickup device of a column amplifier system or the like. In this image pickup unit 11, pixel signals of four pixels are output in parallel in one clock, for example. Accordingly, the pickup frame rate thereof is four times higher than that of an image pickup unit that outputs a pixel signal of one pixel in one clock.

A vertical scanning control circuit 111 selects a line from which pixel signals are to be read. A horizontal scanning control circuit 112 drives a pixel column selecting circuit 113 in order to select pixel positions in the horizontal direction from which pixel signals are to be read. The pixel column selecting circuit 113 includes switches 113$sw$, in each of which one terminal connects to a pixel column orthogonal to a line direction and the other terminal connects to one of output amplifiers 114.

The output amplifiers 114 are provided in parallel, the number thereof corresponding to the number of pixel signals output in one clock. The switches 113$sw$ of the pixel column selecting circuit 113 are assigned to the respective output amplifiers 114 and are connected thereto. For example, when pixel signals of four pixels should be output in parallel in one clock, four output amplifiers 114-1 to 114-4 are provided in parallel. In this case, a switch 113$sw$-(4L−3) connecting to the "4L−3"-th pixel column (L is a natural number) connects to the output amplifier 114-1. Likewise, switches 113$sw$-(4L−2) to 113$sw$-(4L) connecting to the "4L−2"-th to "4L"-th pixel columns connect to the output amplifiers 114-2 to 114-4, respectively.

Herein, the vertical scanning control circuit 111 reads pixel signals of the pixels on the first line, whereas the horizontal scanning control circuit 112 turns on the switches 113$sw$-1 to 113$sw$-4 of the pixel column selecting circuit 113 at the same time. At this time, pixel signals Sp-(1,1) to Sp-(4,1) of pixels P(1,1) to P(4,1) are output in parallel from the output amplifiers 114-1 to 114-4. In the next clock, the horizontal scanning control circuit 112 turns on the switches 113$sw$-5 to 113$sw$-8 of the pixel column selecting circuit 113 at the same time. At this time, pixel signals Sp-(5,1) to Sp-(8,1) of pixels P(5,1) to P(8,1) are output in parallel from the output amplifiers 114-1 to 114-4. In this manner, pixel signals are repeatedly output in parallel in units of four pixels, so that the frame rate of each output image signal SA can be increased by four times compared to that in an image pickup unit that outputs a pixel signal of one pixel in one clock.

Figure 3:
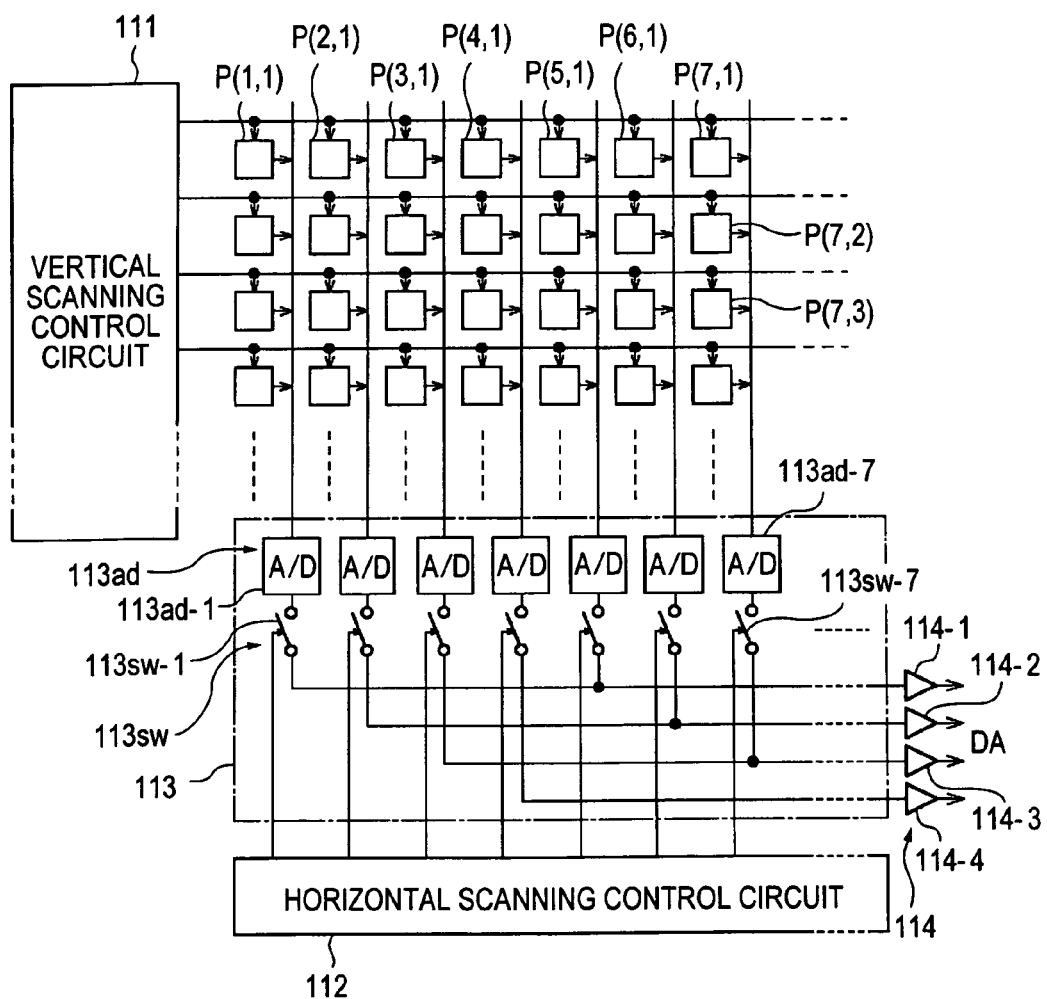
FIG. 3 is a block diagram showing another example of the configuration of the image pickup unit according to the first embodiment.

Alternatively, as shown in FIG. 3, an image pickup unit 11$a$ may be configured by using a CMOS solid state image pickup device of a column A/D converting system so that digital image signals DA can be output. In this case, A/D converters 113$ad$ for performing analog-digital conversion are provided on a signal input side or a signal output side of the switches 113$sw$ of the pixel column selecting circuit 113. The A/D converters 113ad convert analog pixel signals read from the respective pixels to digital pixel signals and supplies the digital pixel signals to the output amplifiers 114. The pixel signals supplied to the A/D converters 113$ad$ are pixel signals of pixels sequentially aligning along the direction orthogonal to the line direction. On the other hand, each of the image signals SA that are output in parallel from the output amplifiers 114 shown in FIG. 2 is a sequence of pixel signals of every four pixels aligned in the horizontal direction. Therefore, if the image signals SA output in parallel are A/D-converted after being passed through a filter to remove an aliasing component, the result of filtering can affect the position of pixels separated in accordance with the number of parallel outputs. However, if a pre-filter (not shown) is provided in each A/D converter 113ad, pixel signals of pixels sequentially aligning along the direction orthogonal to the line direction can be supplied, so that the pre-filter can appropriately remove an aliasing component without affecting the position of pixels separated from each other.

Referring back to FIG. 1, a preprocessor 13-1 adjusts the gain and black level of the image signal SA-1 output from the output amplifier 114-1 of the image pickup unit 11 and supplies the image signal SA-1 to an A/D converter 14-1. The A/D converter 14-1 converts the image signal supplied from the preprocessor 13-1 to a digital image signal DB-1 and supplies it to a memory control unit 15. Preprocessors 13-2 to 13-4 and A/D converters 14-2 to 14-4 perform processes in the same manner as in the preprocessor 13-1 and the A/D converter 14-1, so that digital image signals DB-2 to DB-4 are supplied to the memory control unit 15. Additionally, the A/D converters 14-1 to 14-4 may remove an aliasing component.

When image signals DA-1 to DA-4, from which an aliasing component has been removed, output from the image pickup unit 11a shown in FIG. 3 are used, the preprocessors 13-1 to 13-4 adjust the gain and black level of the image signals DA-1 to DA-4 and supply the adjusted image signals as image signals DB-1 to DB-4 to the memory control unit 15.

Each of the preprocessors 13-1 to 13-4 can individually control the amount of adjustment of gain and black level. By enabling the amount of adjustment to be individually controlled, each image signal can be appropriately adjusted even if the signal levels of the image signals output in parallel from the image pickup unit 11 (11a) vary.

The memory control unit 15 allows a memory 16 to store the supplied digital image signals DB. Also, the memory control unit 15 reads the image signals stored in the memory 16 and supplies those signals to a multiplexer 18.

Figure 4:
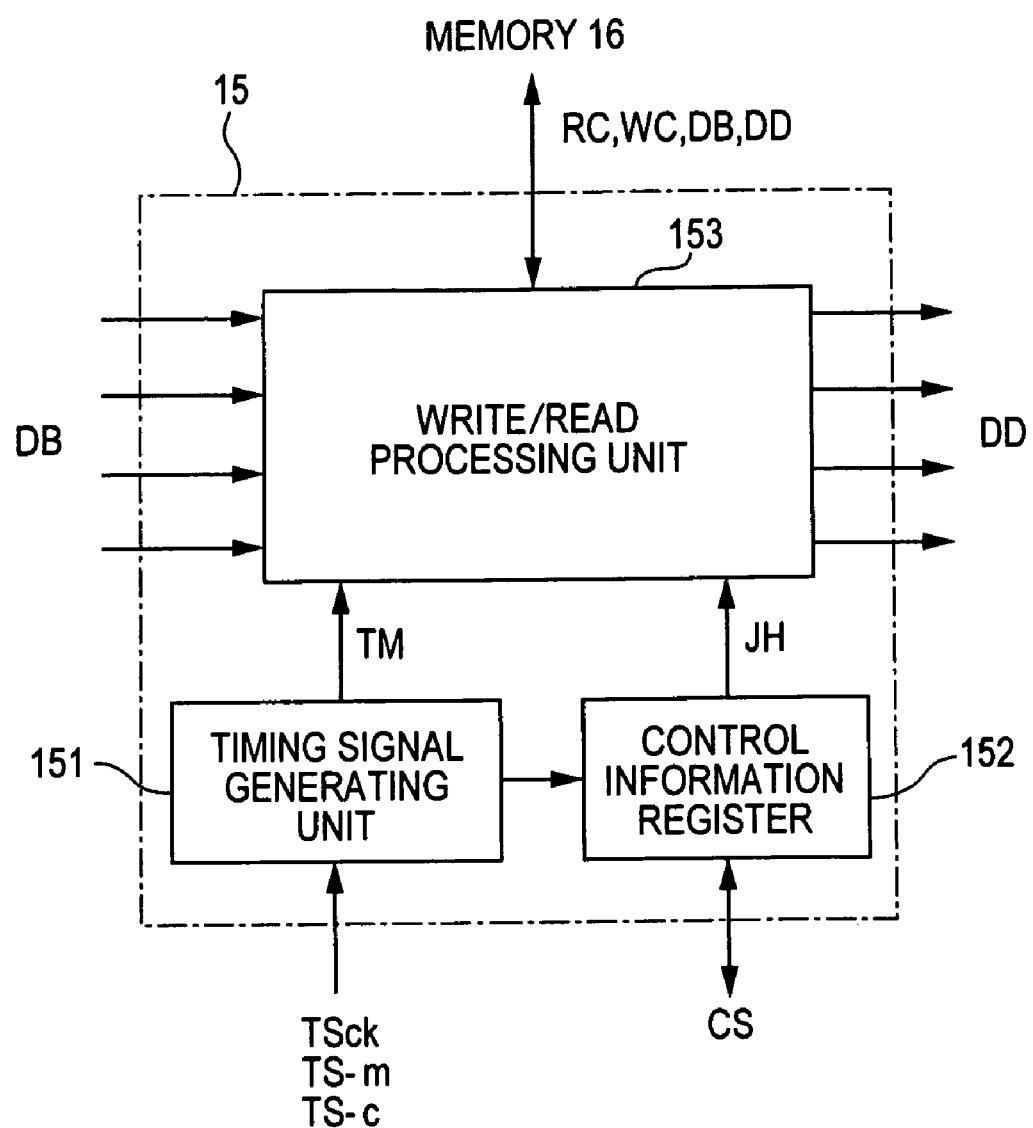
FIG. 4 is a block diagram showing an example of the configuration of a memory control unit according to the first embodiment.

FIG. 4 is a block diagram showing the configuration of the memory control unit 15. The memory control unit 15 includes a timing signal generating unit 151, a control information register 152, and a write/read processing unit 153. The timing signal generating unit 151 generates a timing signal TM serving as a reference to write supplied image signals DB in the memory 16 (hereinafter the image signals written in the memory 16 are called image signals DC) or to read and output the image signals DC written in the memory 16 (hereinafter the image signals read from the memory 16 are called image signals DD). The timing signal TM is generated based on a clock signal TSck and synchronization signals TS-m and TS-c supplied from a synchronization signal generating unit 31 (described below). The control information register 152 connects to an operation control unit 35 (described below) and holds control information supplied from the operation control unit 35 and information about the configuration of the memory 16 and the operation status of the write/read processing unit 153.

The write/read processing unit 153 generates a write control signal WC or a read control signal RC based on the timing signal TM generated by the timing signal generating unit 151 and the control information held in the control information register 152 and supplies the signal to the memory 16, so as to write an image signal in a desired area of the memory 16 or to read an image signal from a desired area of the memory 16. In the example shown in FIG. 4, four image signals DD-1 to DD-4 are output in parallel like the image signals DB.

The write/read processing unit 153 includes a buffer (not shown) to temporarily store image signals to be written in the memory 16 or image signals read from the memory 16. With this configuration, an image signal DB is temporarily stored in the buffer even if the timing when the image signal DB of a pickup frame rate is supplied does not match the timing when the image signal DB is written in the memory 16, so that the image signal DB can be appropriately written in the memory 16. Also, when an image signal is to be read and output from the memory 16, the read image signal is temporarily stored in the buffer. Therefore, even if the image signal is not read at a timing of a desired frame rate, the image signal can be output as an image signal DD of a desired frame rate from the memory control unit 15. For example, the image signal can be output at a display frame rate or a recording frame rate.

In this way, storing image signals of picked up images in the memory 16 enables the frame rate of image signals DB supplied to the memory control unit 15 to be independent from the frame rate of image signals DD output from the memory control unit 15.

The memory 16 is configured using a memory capable of writing/reading signals at high speed so that image signals of a high pickup frame rate can be stored therein or that image signals can be read and output therefrom at a desired frame rate while the image signals of a pickup frame rate are being written in the memory 16. For example, the memory 16 includes a DDRSDRAM (double data rate synchronous dynamic random access memory) capable of writing/reading a signal at both the rising edge and the falling edge of a clock signal.

The multiplexer 18 performs time-division multiplexing on the image signals DD-1 to DD-4 read from the memory 16 so as to generate an image signal in units of frames. Herein, when the memory control unit 15 reads image signals from the memory 16 so as to generate an image signal of a display frame rate in order to display a picked up image, the multiplexer 18 supplies the generated image signal in units of frames as an image signal DE to a VF processing unit 21. On the other hand, when the memory control unit 15 reads image signals from the memory 16 so as to generate an image signal of a recording frame rate in order to record a picked up image, the multiplexer 18 supplies the generated image signal in units of frames as an image signal DF to a main-line processing unit 23.

The VF processing unit 21 includes a pixel-number converting circuit corresponding to the ability of an electronic viewfinder 41 connected thereto, an edge emphasizing circuit for easy focusing, a zebra mixing circuit for superimposing a marker on a signal of a predetermined video level, and a box cursor display circuit for indicating area information, such as an effective frame. With these functions, the VF processing unit 21 performs various processes to aid a user in a recording mode or a standby mode (recording standby status). Further, the VF processing unit 21 performs various signal processes on the image signal DE by using the above-described circuits so as to generate a display signal DG, which is supplied to a D/A converter 22. The D/A converter 22 converts the display signal DG to an analog display signal Vvf and supplies the analog display signal to the electronic viewfinder 41. The electronic viewfinder 41 displays an image that is being picked up or a picked up image stored in the memory 16 based on the supplied display signal Vvf.

The main-line processing unit 23 includes a detecting circuit for controlling exposure, an edge emphasizing circuit for creating an image, a linear matrix circuit for adjusting colors, a gamma correcting circuit for correcting a monitor gamma, and a YC matrix processing circuit serving as an interface for recording picked up images by a recording device 42. The main-line processing unit 23 performs various signal processes on the image signal DF by using the above-described circuits to obtain a video signal Vout and supplies the video signal Vout to the recording device 42. The recording device 42 records the supplied video signal Vout on a recording medium such as a tape or a disc.

The synchronization signal generating unit 31 generates a clock signal TSck and supplies the clock signal to each unit. Also, the synchronization signal generating unit 31 generates a synchronization signal TS-m serving as a reference to generate and process an image signal of a display frame rate or a recording frame rate and supplies the synchronization signal TS-m to the memory control unit 15 and to a processing unit or the like provided in the subsequent stage of the memory control unit 15. Further, the synchronization signal generating unit 31 generates a synchronization signal TS-c serving as a reference to generate and process an image signal of a pickup frame rate and supplies the synchronization signal TS-c to the memory control unit 15, a drive signal generating unit 32, and the preprocessors 13 and the A/D converters 14 in the previous stage of the memory control unit 15.

The drive signal generating unit 32 generates a drive signal RD based on the clock signal TSck and the synchronization signal TS-c supplied from the synchronization signal generating unit 31 and supplies the drive signal RD to the image pickup unit 11 (11a), so as to drive the image pickup unit 11 (11a) to generate image signals SA (DA) of a pickup frame rate.

The operation control unit 35 includes a CPU (central processing unit) and generates a control signal CS on the basis of an operation signal PS generated by a user's operation through a user interface unit 36, which connects to the operation control unit 35. By supplying the control signal CS to each unit, the operation control unit 35 operates the image pickup apparatus in accordance with a user's operation. For example, in a standby mode where the operation mode is in a recording standby status, the operation control unit 35 allows the electronic viewfinder 41 to display images that are being picked up by the image pickup unit 11 (11a) in real time and allows the user to adjust the focus or exposure and to set the angle of view. When the operation mode is set to a recording mode, the operation control unit 35 supplies images that are being picked up by the image pickup unit 11 (11a) to the recording device 42.

In the image pickup apparatus 10, the frame rate of image signals to be written in the memory 16 is equal to or higher than the frame rate of reading the image signals from the memory 16 so that picked up images can be appropriately read even if the image signals written in the memory 16 are read while the image signals of the picked up images are being written in the memory 16.

Now, an operation of the image pickup apparatus is described. Assume that the solid state image pickup device of the image pickup unit 11 (11a) has a so-called HD size, having 2200 pixels in the horizontal direction and 1125 lines in the vertical direction. Under this condition, if the solid state image pickup device is driven at a clock frequency of 74.25 MHz and a pixel signal of one pixel is read in one clock, the pickup frame rate is 30 frames/second.

If pixel signals of four pixels are read in parallel in one clock, as described above, pixels of each line can be read in (2200/4)=550 clocks. That is, the pickup frame rate, which is the frame rate of each image signal DB to be written in the memory 16, is (30×4)=120 frames/second.

Assume that the word length of each image signal DB supplied to the memory control unit 15 is 16 bits, that a bus width between the memory control unit 15 and the memory 16 is 64 bits, and that the memory 16 is composed of a memory of a single port. Under this condition, if write and read of image signals are performed at the same time, the memory 16 is accessed at 148.5 MHz (overhead for accessing the memory is not considered). Therefore, a bandwidth of 74.25 MHz×(4×16) bits is used to write/read image signals.

On the other hand, assuming that the electronic viewfinder 41 has an image display function of an HD size, having 2200 pixels in the horizontal direction and 1125 lines in the vertical direction and that images are displayed at 30 frames/second, a bandwidth of 74.25 MHz×16 bits may be assigned to output of an image signal DE whose display frame rate is 30 frames/second. Therefore, a bandwidth of 74.25 MHz×(64−16) bits is assigned to output of an image signal DF. That is, the multiplexer 18 selects image signals read from the memory 16 by using a band of 74.25 MHz×16 bits in order to display picked up images and supplies an image signal DE of 30 frames/second to the VF processing unit 21. Also, the multiplexer 18 selects image signals read from the memory 16 by using a band of 74.25 MHz×48 bits in order to record picked up images and supplies an image signal DF of a recording frame rate to the main-line processing unit 23.

Figure 5:
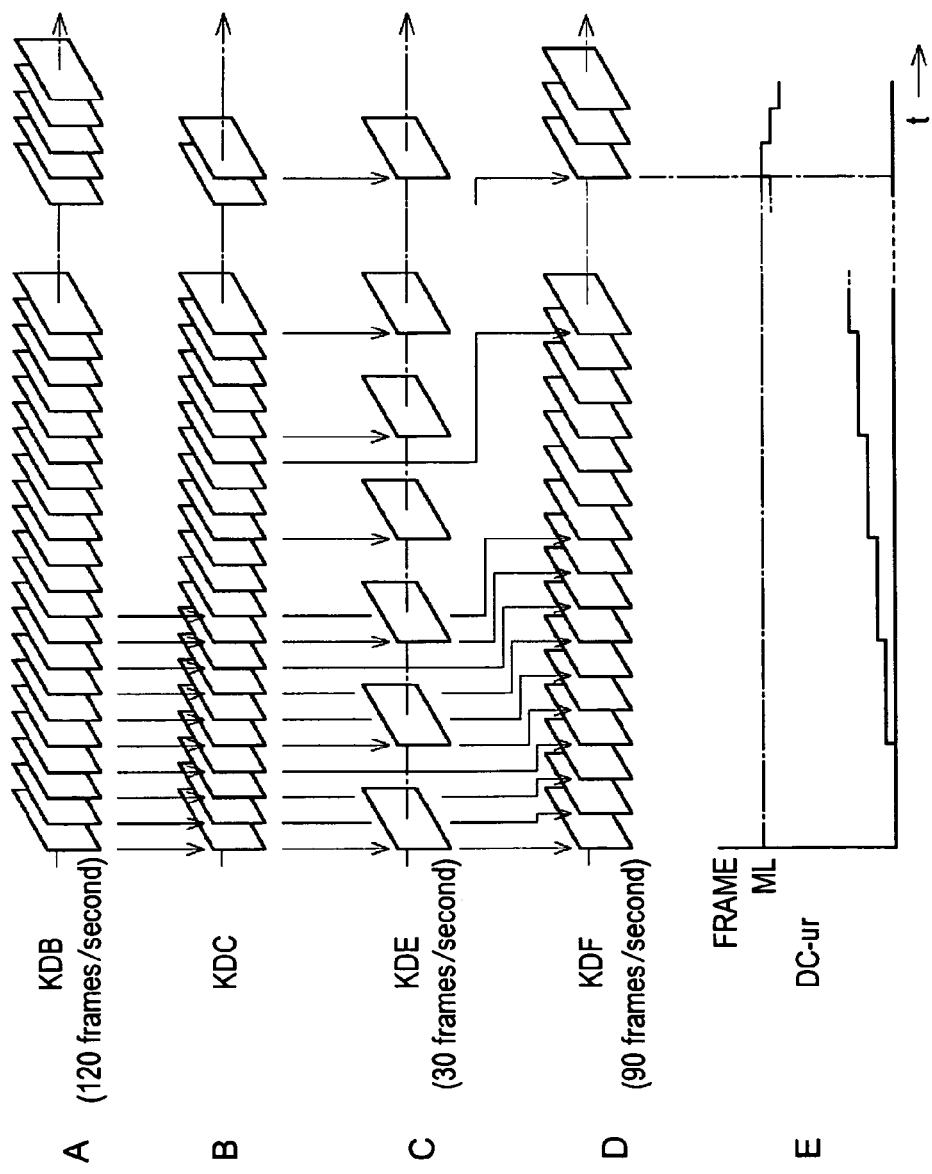
FIG. 5 illustrates an operation of the image pickup apparatus according to the first embodiment.

FIG. 5 illustrates an operation of the image pickup apparatus of simultaneously writing and reading picked up images in/from the memory 16. In this case, the memory control unit 15 sequentially writes image signals DB of picked up images KDB (A in FIG. 5) having a pickup frame rate of 120 frames/second in the memory 16 as image signals DC of picked up images KDC (B in FIG. 5). At the same time, the memory control unit 15 reads the image signals of the picked up images KDC stored in the memory 16 and supplies the read signals to the multiplexer 18 so as to generate image signals of a display frame rate and a recording frame rate. The multiplexer 18 selects image signals that are read to generate an image signal of a display frame rate so as to generate an image signal DE of picked up images KDE (C in FIG. 5) having a display frame rate of 30 frames/second. Also, the multiplexer 18 selects image signals that are read to generate an image signal of a display frame rate so as to generate an image signal DF of picked up images KDF (D in FIG. 5) in which the recording frame rate is 90 frames/second at the maximum.

When image signals DC are to be read from the memory 16 in order to display images that are being picked up in the electronic viewfinder 41 in real time, the memory control unit 15 reads the image signals DC while performing thinning in units of frames in accordance with the display frame rate. For example, the pickup frame rate is 120 frames/second and the display frame rate is 30 frames/second. Therefore, if the image signals DC are sequentially read by repeating a process of reading one frame of picked up image and then thinning three frames of picked up image (hereinafter called "three-frame thinning"), images that are being picked up can be displayed in real time at a display frame rate of 30 frames/second in a recording mode or a standby mode.

Thinning of image signals in the memory control unit 15 may be performed based on control information supplied as one of control signals CS from the operation control unit 35 or based on a gate signal supplied as one of control signals CS from the operation control unit 35.

If all of picked up images are to be recorded by the recording device 42 without thinning the images in a recording mode, image signals DC-ur (E in FIG. 5) before recording stored in the memory 16 increase at a rate of 30 frames/second when write of picked up images and read of the picked up images to be recorded are simultaneously performed and when the reading rate is 90 frames/second. Therefore, the memory control unit 15 stops writing image signals DB when the image signals DC-ur before recording reach a predetermined amount, that is, ML frames. By controlling an operation of writing the image signals DB in this manner, the following disadvantage can be prevented. That is, when a memory area is cyclically used by sequentially storing newly picked up images KDB in a storage area of the oldest images KDB, picked up images to be recorded can be prevented from being rewritten by newly picked up images, so that it can be prevented that discontinuous images are recorded in the recording device 42. Further, since the memory area can be cyclically used, the usage efficiency of the memory 16 can be enhanced. When the memory area is cyclically used, the time period until write of image signals DB is stopped can be extended by setting the recording frame rate at high so as to reduce the difference between the recording frame rate and the pickup frame rate.

Alternatively, reading picked up images to be recorded may be performed independently in a recording mode. In this case, when a predetermined number of frames of picked up images have been stored in the memory 16 after writing image signals DB of picked up images KDB started, writing the image signals DB is stopped. Accordingly, the predetermined number of frames of the picked up images KDB are stored in the memory 16 after the recording mode is selected. Alternatively, writing image signals DB of picked up images KDB may be started when the recording mode is selected and the picked up images may be stored by cyclically using the storage area of the memory 16. Then, when a recording mode ending operation is done in the user interface unit 36, writing the image signals DB is stopped and the predetermined number of frames of picked up images in a reverse time direction from the end of the recording mode are stored in the memory 16. Then, the picked up images stored in the memory 16 are sequentially read and the read images KDF are recorded in a recording medium by using the recording device 42. In this case, picked up images from a desired timing to a desired timing can be recorded by the recording device 42. Incidentally, if an image signal DE of a display frame rate is generated while the picked up images KDB are being written in the memory 16 or while the picked up images KDF are being recorded by the recording device 42, the picked up images that have been written in the memory 16 or the picked up images that have been recorded by the recording device 42 can be displayed in the electronic viewfinder 41.

Herein, if the picked up images whose pickup frame rate is 120 frames/second are read without being thinned in the memory control unit 15 and are recorded by the recording device 42, slow-playback images of ¼-times-rate can be obtained when the recorded images are played back at 30 frames/second, for example.

The display frame rate and the recording frame rate are not limited to 30 frames/second. For example, both the display frame rate and the recording frame rate can be set to 60 frames/second. Alternatively, the display frame rate can be set to 90 frames/second, whereas the recording frame rate can be set to 30 frames/second. Additionally, if image signals are read from the memory 16 while being thinned and then if an image signal DF is supplied to the main-line processing unit 23, slow-playback images in accordance with the number of thinned frames can be obtained.

Figure 6:
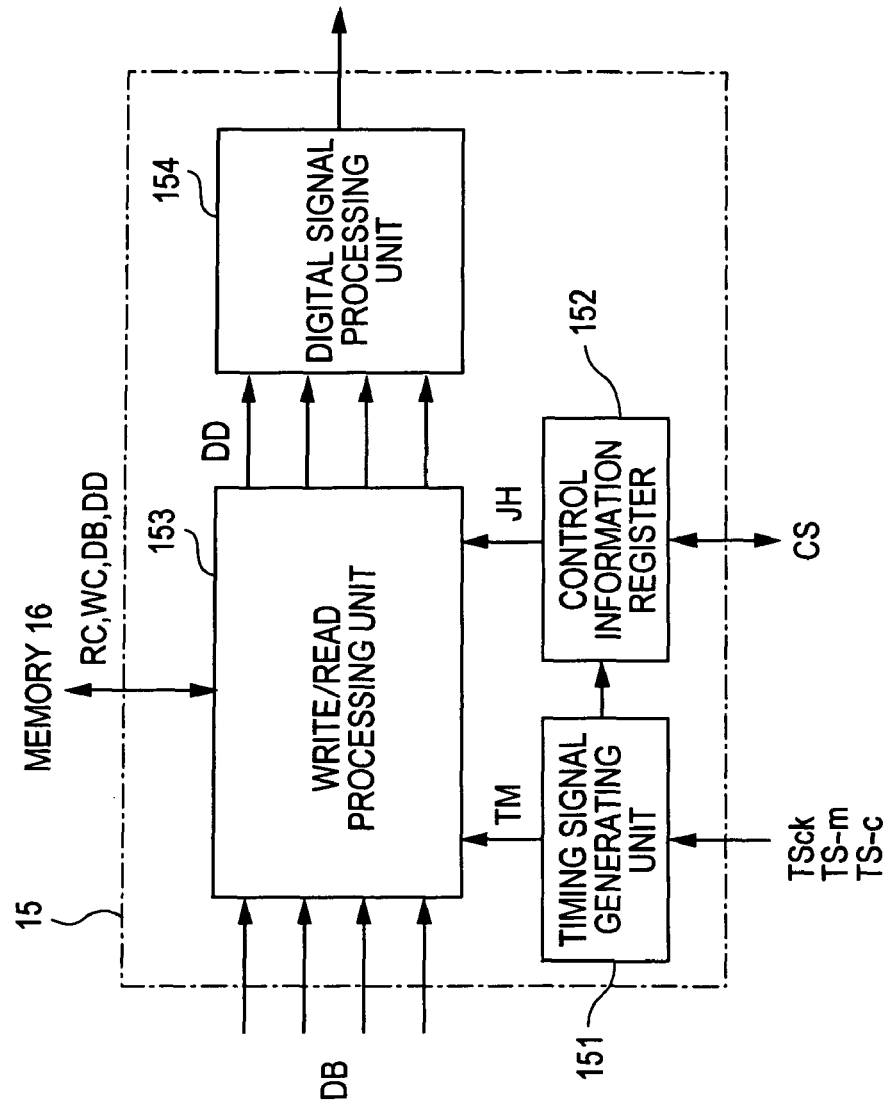
FIG. 6 is a block diagram showing another example of the configuration of the memory control unit according to the first embodiment.

When the display frame rate is 30 frames/second and the recording frame rate of the recording device 42 is 30 frames/second, a band of 74.25 MHz×32 bits is used, and thus an allowance of a band of 74.25 MHz×32 bits is obtained. By using the allowance of the band, image signals are read at a higher frame rate than the display frame rate or the recording frame rate. If a digital signal processing unit is provided to perform digital signal processing, such as filtering, on image signals that have been read at a high frame rate, an image signal DE of the display frame rate or an image signal DF of the recording frame rate on which filtering has been done can be generated. FIG. 6 shows another example of the configuration of the memory control unit 15, in which a digital signal processing unit 154 is provided in the memory control unit 15.

Figure 7:
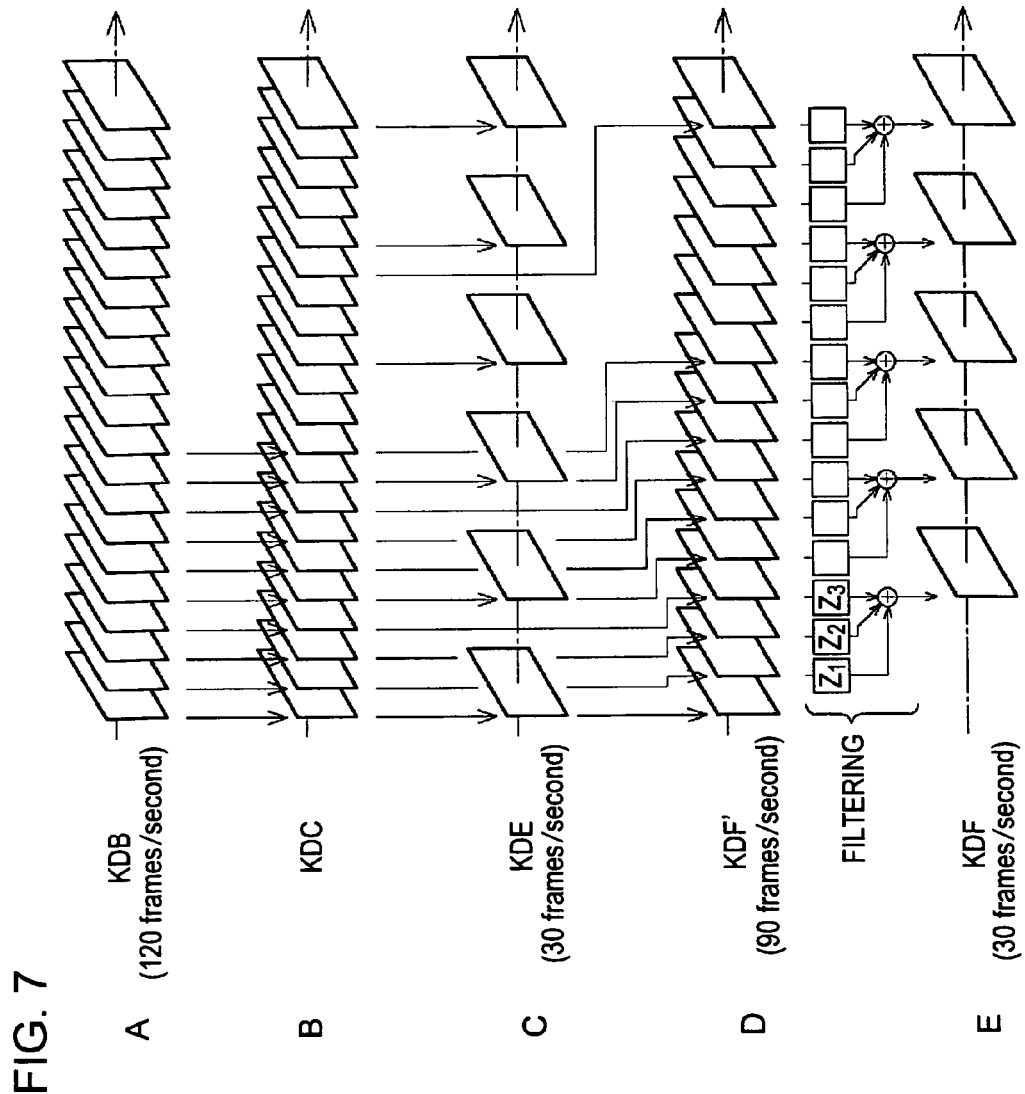
FIG. 7 illustrates an operation of performing filtering according to the first embodiment.

FIG. 7 illustrates an operation of performing filtering in the digital signal processing unit 154. The memory control unit 15 sequentially stores image signals DB of picked up images KDB (A in FIG. 7) of a pickup frame rate of 120 frames/second in the memory 16 as image signals DC of picked up images KDC (B in FIG. 7). At the same time, the memory control unit 15 reads the picked up images KDC stored in the memory 16 so as to generate an image signal of a display frame rate and supplies the read image signals to the multiplexer 18. The multiplexer 18 generates an image signal DE of picked up images KDE (C in FIG. 7) having a display frame rate of 30 frames/second and supplies the image signal DE to the VF processing unit 21. Also, the memory control unit 15 sequentially reads the image signals DC of the picked up images KDC stored in the memory 16 so as to generate image signals of 90 frames/second and supplies the read image signals DC to the digital signal processing unit 154 as image signals DF' of picked up images KDF' (D in FIG. 7).

The digital signal processing unit 154 performs signal processing by using image signals of three frames. For example, a transversal filter function is provided in the digital signal processing unit 154. Under this condition, if filtering is performed by using three frames of picked up images KDF' with filter coefficients z1, z2, and z3 being set to "1, 2, 1", an image signal DF of picked up images KDF (E in FIG. 7) after time filter processing can be generated.

When the image signal DF is to be generated by performing filtering, the image signal DE is multiplied by a coefficient according to the filtering so that the signal level of the image signal DE matches that of the image signal DF. For example, when the image signal DF is generated by simply adding three frames of picked up images by filtering, the signal level of the image signal DF is three times that of the image signal DE. Therefore, by multiplying the image signal DE by a coefficient "3", the signal level of the picked up image KDE can be made equivalent to that of the picked up image KDF. The signal level of the image signal DE may be adjusted by either the digital signal processing unit 154 or the VF processing unit 21. By adjusting the signal level of the image signal DE in accordance with filtering, a significant difference between the picked up image KDF and the picked up image KDE displayed in the electronic viewfinder 41 can be prevented.

Figure 8:
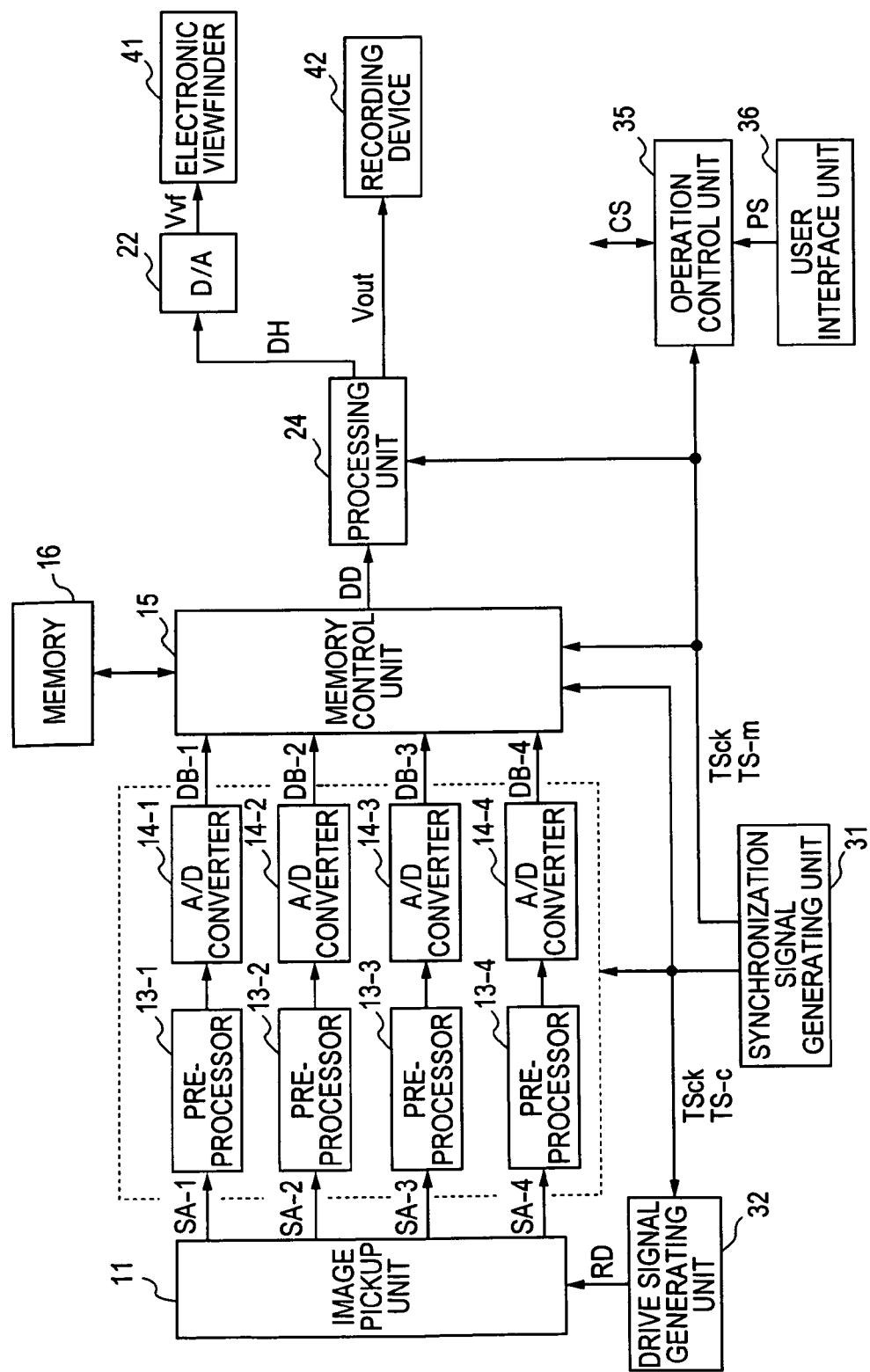
FIG. 8 is a block diagram showing another example of the configuration of the image pickup apparatus according to the first embodiment.

In the above-described embodiment, the VF processing unit 21 and the main-line processing unit 23 are independently provided. Alternatively, a common processing unit 24 may be provided as shown in FIG. 8. In that case, an image signal DH that has been processed by the processing unit 24 may be supplied to the electronic viewfinder 41 through the D/A converter 22 or may be supplied to the recording device 42. In FIG. 8, parts corresponding to those shown in FIG. 1 are denoted by the same reference numerals. Further, in FIG. 8, image signals DD are output from the memory control unit 15 through a single signal line.

In this case, the display frame rate and the recording frame rate can be independent from the pickup frame rate, although the display frame rate and the recording frame rate are restricted to be the same. Further, by reading image signals from the memory 16 while making the most of the band between the memory control unit 15 and the memory 16, image signals of the recording frame rate (=display frame rate) can be generated by performing filtering as described above.

If picked up images read from the memory 16 are supplied as a sequence of signals to the processing unit 24, realtime display of picked up images KDE and recording of picked up images KDF in order of frames cannot be performed at the same time. For example, assume that the pickup frame rate is 120 frames/second and that the display frame rate and the recording frame rate are 30 frames/second, respectively. In this case, if the picked up images KDE should be displayed in real time, the picked up images need to be read while performing three-frame thinning. However, if the picked up images are read while performing three-frame thinning, it may become impossible to record all of the picked up images in the recording device 42 in order of frames. For this reason, images are picked up while image signals of a display frame rate for displaying the picked up images in real time are being recorded in the recording device 42. After the images have been picked up, image signals of the picked up images that are thinned and are not recorded are supplied to the recording device 42, where the images are sorted in a correct frame order and are recorded.

When the processing unit 24 is provided, processing during an image pickup operation can be simplified by performing the following operations individually: an operation of storing picked up images KDB in the memory 16 while displaying picked up images KDE in real time in the electronic viewfinder 41; an operation of recording picked up images KDC stored in the memory 16 by the recording device 42 while displaying picked up images KDE in the electronic viewfinder 41; and an operation of storing picked up images KDB in the memory 16 while recording picked up images KDC stored in the memory 16 by the recording device 42.

The frame rate, the size of images, and so on described in this embodiment are only an example used for simplifying the description. Of course, another frame rate or size can be accepted.

Second Embodiment

Hereinafter, a second embodiment of the present invention is described with reference to the drawings. FIG. 9 is a block diagram showing the configuration of an image pickup apparatus 10.

An image pickup unit 11 generates image signals of a pickup frame rate by using a CMOS or CCD solid state image pickup device. The pickup frame rate is equal to or higher than a recording frame rate used to record picked up images in a recording medium or a display frame rate of images displayed in a viewfinder.

Figure 10:
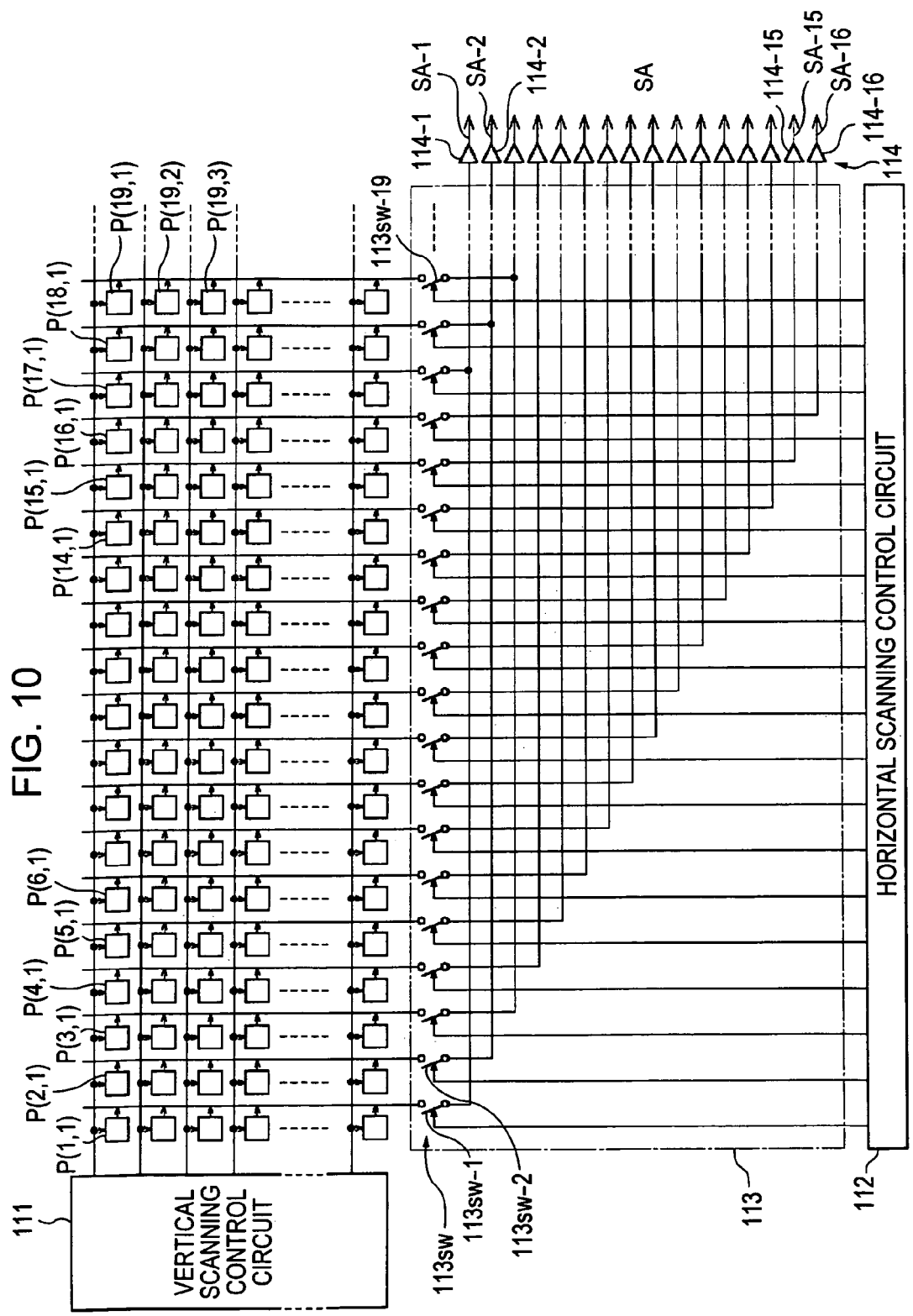
FIG. 10 is a block diagram showing the configuration of an image pickup unit according to the second embodiment.

FIG. 10 is a block diagram showing the configuration of the image pickup unit 11 using a CMOS solid state image pickup device of a column amplifier system or the like. In this image pickup unit 11, pixel signals of sixteen pixels are output in parallel in one clock, for example. Accordingly, the pickup frame rate thereof is sixteen times higher than that of an image pickup unit that outputs a pixel signal of one pixel in one clock.

A vertical scanning control circuit 111 selects a line from which pixel signals are to be read. A horizontal scanning control circuit 112 drives a pixel column selecting circuit 113 in order to select pixel positions in the horizontal direction from which pixel signals are to be read. The pixel column selecting circuit 113 includes switches 113sw, in each of which one terminal connects to a pixel column orthogonal to a line direction and the other terminal connects to one of output amplifiers 114.

The output amplifiers 114 are provided in parallel, the number thereof corresponding to the number of pixel signals output in one clock. The switches 113sw of the pixel column selecting circuit 113 are assigned to the respective output amplifiers 114 and are connected thereto. For example, when pixel signals of sixteen pixels should be output in parallel in one clock, sixteen output amplifiers 114-1 to 114-16 are provided in parallel. In this case, a switch 113sw-(4L+1) connecting to the "4L+1"-th pixel column (L is 0 or a positive integer) connects to the output amplifier 114-1. Likewise, switches 113sw-(4L+2) to 113sw-(4L+16) connecting to the "4L+2"-th to "4L+16"-th pixel columns connect to the output amplifiers 114-2 to 114-16, respectively.

Herein, the vertical scanning control circuit 111 reads pixel signals of the pixels on the first line, whereas the horizontal scanning control circuit 112 turns on the switches 113sw-1 to 113sw-16 of the pixel column selecting circuit 113 at the same time. At this time, pixel signals Sp-(1,1) to Sp-(16,1) of pixels P(1,1) to P(16,1) are output in parallel from the output amplifiers 114-1 to 114-16. In the next clock, the horizontal scanning control circuit 112 turns on the switches 113sw-17 to 113sw-32 of the pixel column selecting circuit 113 at the same time. At this time, pixel signals Sp-(17,1) to Sp-(32,1) of pixels P(17,1) to P(32,1) are output in parallel from the output amplifiers 114-1 to 114-16. In this manner, pixel signals are repeatedly output in parallel in units of sixteen pixels, so that the frame rate of each output image signal SA can be increased by sixteen times compared to that in an image pickup unit that outputs a pixel signal of one pixel in one clock.

The image pickup unit 11 supplies image signals SA, which are generated by reading pixel signals of sixteen pixels in parallel, to four converting blocks 12a to 12d. Each of the converting blocks 12a to 12d converts the frame rate of each image signal by controlling writing supplied image signals in a memory and reading image signals written in the memory.

The image signals SA are assigned to the converting blocks 12a to 12d so that sequential images can be obtained when the image signals are read in the converting blocks 12a to 12d. Specifically, the image signal SA-1 from the output amplifier 114-1, the image signal SA-5 from the output amplifier 114-5, the image signal SA-9 from the output amplifier 114-9, and the image signal SA-13 from the output amplifier 114-13 are supplied to the converting block 12a. Likewise, the image signal SA-2 from the output amplifier 114-2, the image signal SA-6 from the output amplifier 114-6, the image signal SA-10 from the output amplifier 114-10, and the image signal SA-14 from the output amplifier 114-14 are supplied to the converting block 12b. The image signal SA-3 from the output amplifier 114-3, the image signal SA-7 from the output amplifier 114-7, the image signal SA-11 from the output amplifier 114-11, and the image signal SA-15 from the output amplifier 114-15 are supplied to the converting block 12c. The image signal SA-4 from the output amplifier 114-4, the image signal SA-8 from the output amplifier 114-8, the image signal SA-12 from the output amplifier 114-12, and the image signal SA-16 from the output amplifier 114-16 are supplied to the converting block 12d. By assigning the image signals SA in this manner, signals of sequential pixels can be read when reading image signals is performed in the converting blocks 12a to 12d. For example, signals of the sequential pixels P(1,1) to P(4,1) can be read at the first reading, and signals of the sequential pixels P(5,1) to P(8,1) can be read at the next reading.

A preprocessor 13-1 of the converting block 12a adjusts the gain and black level of the image signal SA-1 and supplies the image signal SA-1 after adjustment to an A/D converter 14-1. The A/D converter 14-1 converts the image signal SA-1 processed by the preprocessor 13-1 to a digital signal. Also, the A/D converter 14-1 removes an aliasing component that was generated in A/D conversion and supplies an obtained digital image signal DB-1 to a memory control unit 15. Preprocessors 13-2 to 13-4 and A/D converters 14-2 to 14-4 perform the same processing as that of the preprocessor 13-1 and the A/D converter 14-1 so as to process the image signals SA-5, SA-9, and SA-13 to generate digital image signals DB-5, DB-9, and DB-13, which are supplied to the memory control unit 15.

The memory control unit 15 controls write/read of image signals in/from a memory 16, converts the supplied digital image signals DB-1, DB-5, DB-9, and DB-13 to an image signal DD-a of a different frame rate, and supplies the image signal DD-a to a multiplexer 18.

Figure 11:
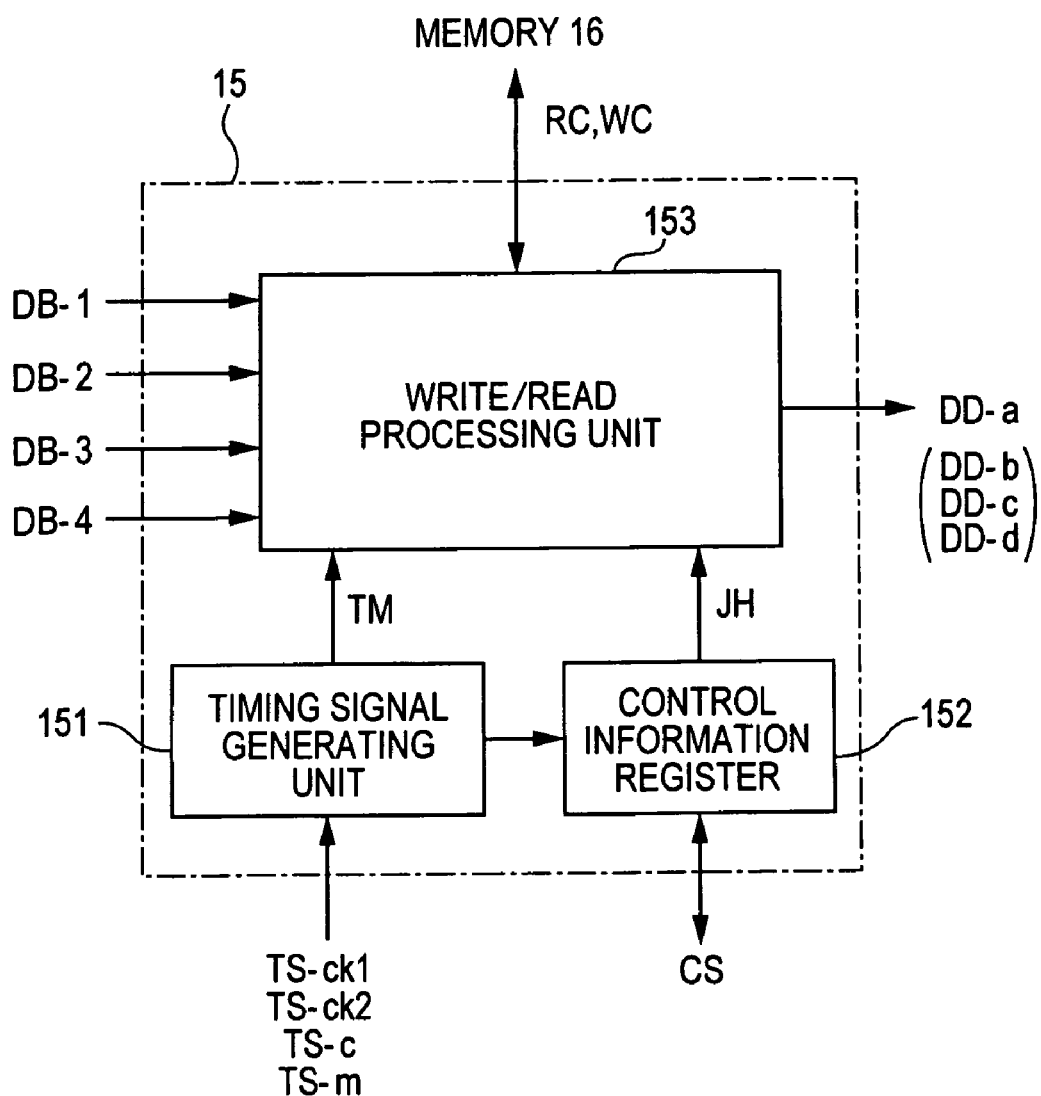
FIG. 11 is a block diagram showing the configuration of a memory control unit according to the second embodiment.

FIG. 11 is a block diagram showing the configuration of the memory control unit 15. The memory control unit 15 includes a timing signal generating unit 151, a control information register 152, and a write/read processing unit 153. The timing signal generating unit 151 generates a timing signal TM serving as a reference to write the supplied image signals DB-1, DB-5, DB-9, and DB-13 in the memory 16 and to read an image signal written in the memory 16 and output the image signal as an image signal DD-a. The timing signal TM is generated based on clock signals TS-ck1 and TS-ck2 and synchronization signals TS-m and TS-c supplied from a synchronization signal generating unit 31 (described below). The control information register 152 connects to an operation control unit 35 (described below) and holds control information supplied from the operation control unit 35 and information about the configuration of the memory 16 and the operation status of the write/read processing unit 153.

The write/read processing unit 153 generates a write control signal WC or a read control signal RC based on the timing signal TM generated by the timing signal generating unit 151 and the control information JH held in the control information register 152 and supplies the generated signal to the memory 16. Accordingly, the write/read processing unit 153 writes image signals in a desired area of the memory 16 or reads image signals from a desired area of the memory 16 so as to output an image signal DD-a. Also, the write/read processing unit 153 includes a buffer (not shown) to temporarily store image signals to be written in the memory 16 or image signals read from the memory 16. With this configuration, even if the timing when an image signal DB of a pickup frame rate is supplied does not match the timing when the image signal DB is written in the memory 16, the image signal DB can be temporarily stored in the buffer and thus the image signal DB can be appropriately written in the memory 16. Also, when an image signal is read from the memory 16 to be output, the read image signal is temporarily stored in the buffer. Accordingly, even if the image signal is not read at the timing of a desired frame rate, the image signal can be output from the memory control unit 15 as an image signal DD of a desired frame rate. For example, the image signal can be output at a display frame rate or a recording frame rate.

In this way, storing image signals of picked up images in the memory 16 enables the frame rate of each image signal DB supplied to the memory control unit 15 to be independent from the frame rate of the image signal DD-a output from the memory control unit 15.

The memory 16 is configured using a memory capable of writing/reading signals at high speed so that image signals of a high pickup frame rate can be stored therein or that image signals can be read and output therefrom at a desired frame rate while the image signals of a pickup frame rate are being written in the memory 16. For example, the memory 16 includes a DDRSDRAM (double data rate synchronous dynamic random access memory) capable of writing/reading a signal at both the rising edge and the falling edge of a clock signal.

Each of the converting blocks 12b to 12d has the same configuration as that of the converting block 12a. The converting block 12b processes the image signals SA-2, SA-6, SA-10, and SA-14 so as to generate an image signal DD-b of a different frame rate and supplies the image signal DD-b to the multiplexer 18. The converting block 12c processes the image signals SA-3, SA-7, SA-11, and SA-15 so as to generate an image signal DD-c of a different frame rate and supplies the image signal DD-c to the multiplexer 18. The converting block 12d processes the image signals SA-4, SA-8, SA-12, and SA-16 so as to generate an image signal DD-d of a different frame rate and supplies the image signal DD-d to the multiplexer 18.

If the amount of adjustment of the gain and black level can be independently controlled in the respective preprocessors 13-1 to 13-4 of the converting blocks 12a to 12d, image signals SA that are output in parallel from the image pickup unit 11 can be appropriately adjusted to generate image signals DD even if the signal levels of the image signals SA vary.

As described above, by storing image signals of picked up images in the memory, the converting blocks 12a to 12d enable the frame rate of the image signals SA-1 to SA-16 to be independent from the frame rate of the image signals DD-a to DD-d.

The multiplexer 18 processes the image signals DD-a to DD-d supplied from the converting blocks 12a to 12d by time division multiplexing so as to generate an image signal DDM in units of frames, and supplies the image signal DDM to a processing unit 21.

The processing unit 21 includes a pixel-number converting circuit corresponding to the ability of an electronic viewfinder 41 connected thereto, an edge emphasizing circuit for easy focusing, a zebra mixing circuit for superimposing a marker on a signal of a predetermined video level, and a box cursor display circuit for indicating area information, such as an effective frame. With this configuration, the processing unit 21 performs various processes to aid a user when images are picked up. The processing unit 21 further includes a detecting circuit for controlling exposure, an edge emphasizing circuit for creating an image, a linear matrix circuit for adjusting colors, a gamma correcting circuit for correcting a monitor gamma, and a YC matrix processing circuit serving as an interface for recording picked up images by the recording device 42, and performs processes in order to obtain favorable picked up images.

The processing unit 21 supplies an image signal DE, which is obtained by performing various processes to aid the user during image pickup, to a D/A converter 22. The D/A converter 22 converts the image signal DE to an analog display signal Vvf and supplies the analog display signal Vvf to the electronic viewfinder 41. The electronic viewfinder 41 displays an image that is being picked up or a picked up image stored in the memory 16 based on the supplied display signal Vvf.

Further, the processing unit 21 supplies a video signal Vout, which is obtained by performing a process to obtain a favorable picked up image, to the recording device 42. The recording device 42 records the supplied video signal Vout in a recording medium such as a tape or a disc.

The synchronization signal generating unit 31 includes signal generating units 311 and 312 and a PLL circuit 313. The signal generating unit 311 generates a clock signal TS-ck1 and a synchronization signal TS-m serving as a reference to generate or process an image signal of a display frame rate or a recording frame rate. The signal generating unit 312 generates a clock signal TS-ck2 and a synchronization signal TS-c serving as a reference to generate or process an image signal of a pickup frame rate. The PLL circuit 313 functions to synchronize the clock signal TS-ck1 or the synchronization signal TS-c and the clock signal TS-ck2 or the synchronization signal TS-m. The synchronization signal generating unit 31 supplies the clock signal TS-ck1 and the synchronization signal TS-m generated by the signal generating unit 311 to the memory control unit 15 and a block provided in the subsequent stage of the memory control unit 15. Also, the synchronization signal generating unit 31 supplies the clock signal TS-ck2 and the synchronization signal TS-c generated by the signal generating unit 312 to the memory control unit 15, a drive signal generating unit 32, and the preprocessors 13 and the A/D converters 14 in the previous stage of the memory control unit 15.

The drive signal generating unit 32 generates a drive signal RD based on the clock signal TS-ck2 and the synchronization signal TS-c supplied from the synchronization signal generating unit 31, supplies the drive signal RD to the image pickup unit 11, and drives the image pickup unit 11 so as to generate image signals of a pickup frame rate.

The operation control unit 35 includes a CPU. The operation control unit 35 generates a control signal CS based on an operation signal PS that is supplied in accordance with a user's operation from a user interface unit 36 connected to the operation control unit 35, and then supplies the control signal CS to each unit. Accordingly, the image pickup apparatus is operated in accordance with the user's operation.

Now, an operation of the image pickup apparatus is described. Assuming that the size of a picked up image in the image pickup unit 11 is 2200 pixels in the horizontal direction and 1125 lines in the vertical direction, that the clock frequency is 74.25 MHz, and that a pixel signal of one pixel is read in one clock, the pickup frame rate is 30 frames/second.

Under this condition, if pixel signals of sixteen pixels are to be read in one clock, pixels of each line can be read in (2200/16)=137.5 clocks. Therefore, by driving the apparatus with 138 horizontal clocks and a clock frequency of 74.25 MHz, the pickup frame rate can be increased to 480 frames/second, which is sixteen times higher than 30 frames/second.

As described above, image signals are supplied by being assigning to the four converting blocks 12a to 12d. Therefore, in each converting block, image signals DB are written in the memory 16 at a speed equivalent to the speed of writing picked up images whose pickup frame rate is 120 frames/second in real time.

On the other hand, in a case of reading image signals written in the memory, assuming that the display frame rate in the electronic viewfinder 41 and the recording frame rate in the recording device 42 are 30 frames/second, the four converting blocks 12a to 12d and the multiplexer 18 perform reading image signals from the memory 16 and time-division multiplexing so that the frame rate of the image signals DDM becomes 30 frames/second.

Figure 12:
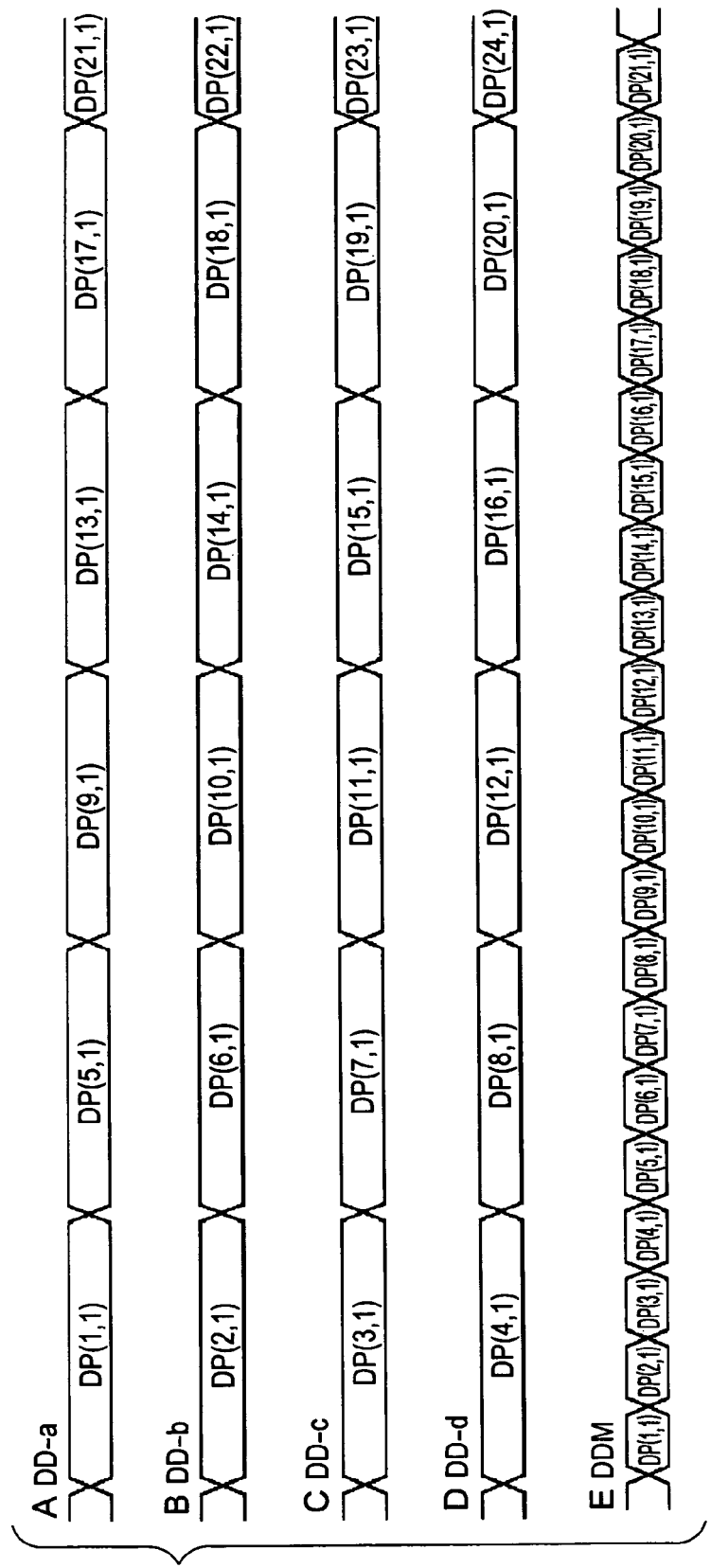
FIG. 12 illustrates an operation of reading image signals according to the second embodiment.

As described above, the image signals SA that are generated by reading pixel signals of sixteen pixels in parallel in the image pickup unit 11 are assigned to the four converting blocks 12a to 12d so that signals of sequential pixels can be obtained when the image signals are read in the converting blocks 12a to 12d. Therefore, if an image signal of one pixel is read from the memory 16 in each of the four converting blocks 12a to 12d, signals of four sequential pixels P(1,1) to P(4,1) can be read as shown in FIG. 12. In FIG. 12, digital pixel signals of the pixels P(1,1) to P(4,1) are shown as pixel signals DP(1,1) to DP(4,1). Also, in FIG. 12, "A" indicates an image signal DD-a, "B" indicates an image signal DD-b, "C" indicates an image signal DD-c, and "D" indicates an image signal DD-d. The multiplexer 18 sequentially selects the pixel signals DP(1,1) to DP(4,1) in order of pixels so as to generate the image signal DDM indicated by "E" in FIG. 12.

Herein, if the frame rate of the image signal DDM should be 30 frames/second, the image signals DD-a to DD-d should be sequentially selected at 74.25 MHz. In other words, the image signals should be read in order of pixels from the respective memories 16 of the four converting blocks 12a to 12d at (74.25/4) MHz.

Figure 13:
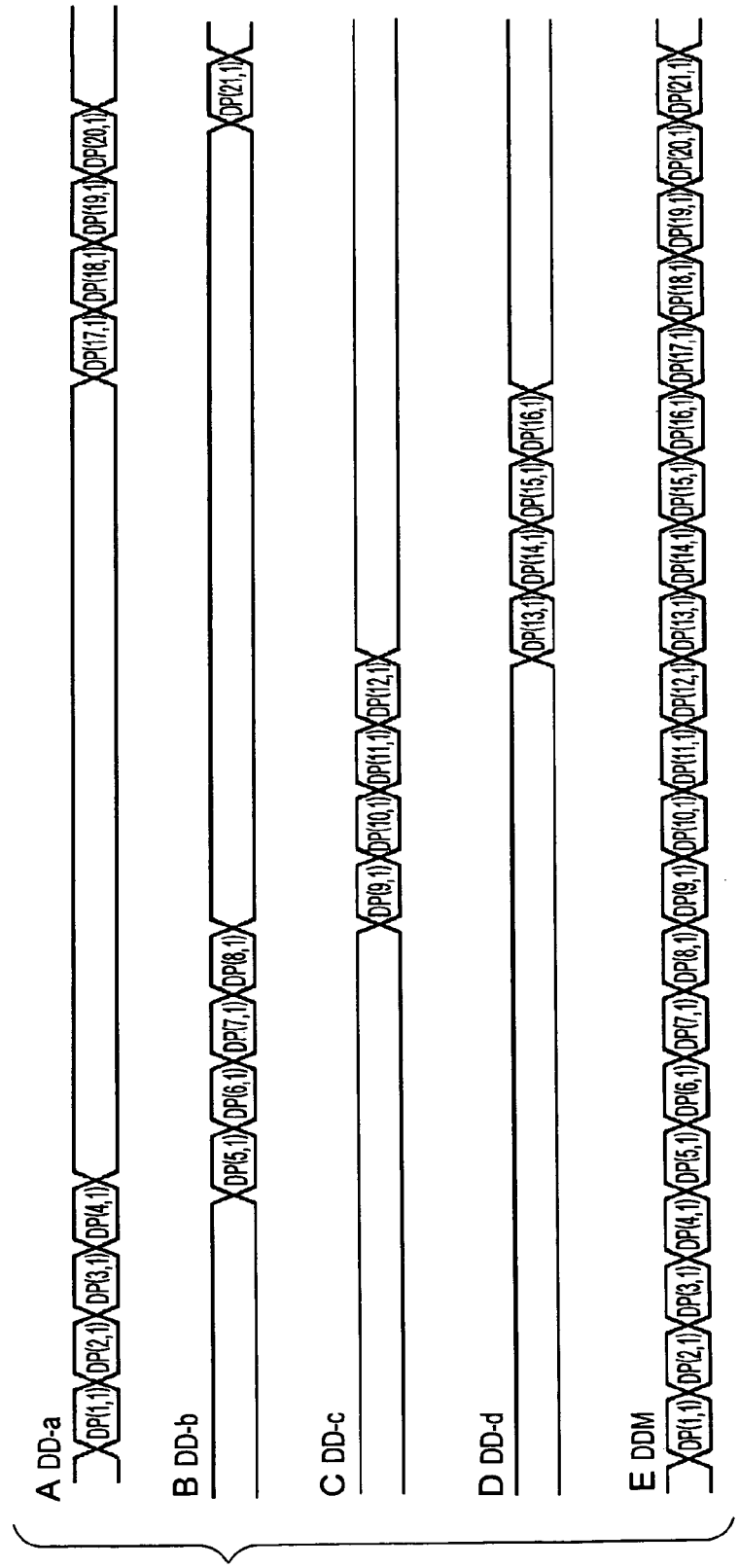
FIG. 13 illustrates another operation of reading image signals according to the second embodiment.

FIG. 13 illustrates an image signal reading operation that is performed when the image signals SA generated by reading pixel signals of sixteen pixels in parallel in the image pickup unit 11 are assigned in order of pixels. Herein, if the image signals SA are assigned in order of pixels, pixel signals of four sequential pixels are supplied to each of the converting blocks 12a to 12d. Therefore, when the image signals written in the memory are to be read, pixel signals of four sequential pixels are read from each of the converting blocks, which are switched every time four pixel signals are read. In this case, the multiplexer 18 needs to select a signal of each pixel.

For example, as shown in "A" in FIG. 13, an image signal reading operation is performed in the converting block 12a at 74.25 MHz, so that pixel signals DP(1,1) to DP(4,1) of four sequential pixels P(1,1) to P(4,1) are read as an image signal DD-a. Then, the converting block where an image signal is to be read is switched to the converting block 12b, where pixel signals DP(5,1) to DP(8,1) of four sequential pixels P(5,1) to P(8,1) are read as an image signal DD-b, as shown in "B" in FIG. 13. Then, as shown in "C" in FIG. 13, pixel signals DP(9,1) to DP(12,1) of four sequential pixels P(9,1) to P(12,1) are read as an image signal DD-c in the converting block 12c. Likewise, as shown in "D" in FIG. 13, pixel signals DP(13,1) to DP(16,1) of four sequential pixels P(13,1) to P(16,1) are read as an image signal DD-d in the converting block 12d. Then, pixel signals DP(17,1) to DP(20,1) of four sequential pixels P(17,1) to P(20,1) are read as the image signal DD-a in the converting block 12a. On the other hand, the multiplexer 18 sequentially selects the pixel signals in order of pixels at 74.25 MHz so as to generate an image signal DDM, as shown in "E" in FIG. 13.

If the image signals SA are assigned in order of pixels, the image signals have to be read from the converting blocks at 74.25 MHz and the converting blocks where the image signals are read have to be switched. Further, since pixel signals of four sequential pixels are read from each converting block, the multiplexer 18 has to select each image signal with high accuracy.

However, as described above, if the image signals SA are assigned to the plurality of converting blocks so that signals of sequential pixels can be obtained when the image signals are read in the respective converting blocks, pixel signals of a plurality of sequential pixels can be output in parallel from the plurality of converting blocks. Thus, the rate of reading image signals from the memory in each converting block can be set at low and the converting blocks where the image signals are read need not be switched. Further, since the rate of reading the image signals is low and pixel signals of a plurality of sequential pixels are output in parallel, the multiplexer 18 can correctly generate the image signal DDM without selecting image signals with high accuracy, unlike in the case where pixel signals of a plurality of sequential pixels are sequentially read from each converting block. Therefore, the frame rate can be easily changed even if signals of a plurality of sequential pixels are output in parallel and if the pickup frame rate is high.

When the multiplexer 18 supplies the image signal DDM to the processing unit 21 so as to generate a display signal Vvf and a video signal Vout, realtime display of picked up images and recording the picked up images in order of frames cannot be performed at the same time. For example, assume that the pickup frame rate is 120 frames/second and that the display frame rate and the recording frame rate are 30 frames/second. In this case, picked up images must be read while three-frame thinning is being performed in order to display the picked up images in real time. However, if the picked up images are read while three-frame thinning is being performed, the picked up images cannot be recorded in the recording device 42 in order of frames without thinning the images. For this reason, images are picked up while image signals of a display frame rate for displaying the picked up images in real time are being recorded in the recording device 42. After the images have been picked up, image signals of the picked up images that are thinned and are not recorded are supplied to the recording device 42, where the images are sorted in a correct frame order and are recorded.

Further, by individually performing an operation of storing picked up images in the memory 16 while displaying the picked up images in the electronic viewfinder 41 in real time and an operation of recording the picked up images stored in the memory 16 by the recording device 42, processing during an image pickup operation can be simplified.

For example, when an operation to start writing picked up images is done in the user interface unit 36, writing image signals DB in the memory 16 is started. Then, the writing operation is stopped after image signals DB of a predetermined number of frames have been stored in the memory 16. Accordingly, the predetermined number of frames of picked up images from the start of writing are stored in the memory 16. Alternatively, when an operation to stop writing picked up images is done in the user interface unit 36 after writing of image signals DB started, the writing of the image signals DB is stopped. Accordingly, picked up images before the write stopping operation can be stored in the memory 16.

Then, the picked up images stored in the memory 16 are read and the read images are recorded in the recording medium by the recording device 42. If an image signal DE is generated by the processing unit 21 when the picked up images are being recorded, the picked up images recorded by the recording device 42 can be displayed in the electronic viewfinder 41.

The frame rate and the size of images described in the above-described embodiment are only an example for easy understanding, so that another frame rate or size can be used.

It should be understood by those skilled in the art that various modifications, combinations, sub-combinations and alterations may occur depending on design requirements and other factors insofar as they are within the scope of the appended claims or the equivalents thereof.

What is claimed is:
1. An image pickup apparatus, comprising:
an image pickup device configured to generate image signals of picked up images;
a converting unit configured to convert the image signals generated by the image pickup device to digital image signals;
a memory configured to store the image signals obtained by the converting unit; and
a memory control unit configured to control writing the image signals in the memory and reading each of the image signals from the memory, wherein
the memory control unit assigns bands of the memory in order to simultaneously perform writing image signals in the memory and reading the image signals from the memory for displaying the picked up images or reading the image signals from the memory for recording the picked up images at different frame rates,
the memory control unit is configured to sequentially store the picked up images in the memory by cyclically replacing an oldest image of the picked up images with a newest image of the picked up images, and
a frame rate used to write the image signals in the memory is higher than a frame rate used to read the image signals from the memory.

2. The image pickup apparatus according to claim 1, further comprising:
a digital signal processing unit configured to process the image signals read from the memory,
wherein the memory control unit reads the image signals from the memory for displaying the picked up images at a higher frame rate than a display frame rate of the picked up images, and
wherein the digital signal processing unit generates a display signal of the display frame rate using the image signals read at the higher frame rate.

3. The image pickup apparatus according to claim 1, further comprising:
a digital signal processing unit configured to process the image signals read from the memory,
wherein the memory control unit reads the image signals from the memory for recording the picked up images at a higher frame rate than a recording frame rate of the picked up images, and
wherein the digital signal processing unit generates a video signal of the recording frame rate using the image signals read at the higher frame rate.

4. The image pickup apparatus according to claim 1, wherein
the reading the image signals from the memory is performed in a sequential frame order of the picked up images,
the memory control unit thins the image signals read from the memory such that the picked up images are divided into a first picked up images group and a second picked up images group,
the displaying the picked up images includes displaying the first group in real time at the display frame rate,
the recording the picked up images includes recording the second group in a recording device, and
after the second group is recorded, the first group is sorted in the sequential frame order and recorded.

5. An image pickup method, comprising:
generating image signals of picked up images;
converting the image signals generated by the generating to digital image signals; and controlling writing the image signals obtained by the converting in a memory and reading each of the image signals from the memory, wherein the controlling includes assigning bands of the memory in order to simultaneously perform the writing the image signals in the memory and the reading the image signals from the memory for displaying the picked up images or the reading the image signals from the memory for recording the picked up images at different frame rates, the controlling includes sequentially storing the picked up images in the memory by cyclically replacing an oldest image of the picked up images with a newest image of the picked up images, and a frame rate used to write the image signal in the memory is higher than a frame rate used to read the image signal from the memory.

6. The image pickup method according to claim 5, further comprising:

processing the image signals read from the memory, wherein the controlling includes reading the image signals from the memory for displaying the picked up images at a higher frame rate than a display frame rate of the picked up images, and wherein the processing includes generating a display signal of the display frame rate using the image signals read at the higher frame rate.

7. The image pickup method according to claim 5, further comprising:

processing the image signals read from the memory, wherein the controlling includes reading the image signals from the memory for recording the picked up images at a higher frame rate than a recording frame rate of the picked up images, and wherein the processing includes generating a video signal of the recording frame rate using the image signals read at the higher frame rate.

8. The image pickup method according to claim 5, wherein the reading the image signals from the memory is performed in a sequential frame order of the picked up images, the controlling includes thinning the image signals read from the memory such that the picked up images are divided into a first picked up images group and a second picked up images group, the displaying the picked up images includes displaying the first group in real time at the display frame rate, the recording the picked up images includes recording the second group in a recording device, and after the second group is recorded, the first group is sorted in the sequential frame order and recorded.

9. An image pickup apparatus, comprising:

an image pickup unit configured to output image signals of picked up images; and a plurality of converting units configured to convert a frame rate of the image signals by controlling writing the image signals output from the image pickup unit in a memory and reading the image signals written in the memory, wherein each of the image signals output from the image pickup unit are assigned to the plurality of converting units so that each of the image signals are arranged in order of sequential pixels when each of the image signals are read in the plurality of converting units, and a frame rate of the picked up images is higher than a recording frame rate used to record the picked up images in a recording medium or a display frame rate used to display the picked up images.

10. The image pickup apparatus according to claim 9, wherein the image pickup unit outputs the image signals of the picked up images in parallel in units of a plurality of sequential pixels and assigns the output image signals to the plurality of converting units.

11. The image pickup apparatus according to claim 9, wherein the reading the image signals from the memory is performed in a sequential frame order of the picked up images, each of the converting units includes a memory control unit configured to thin the image signals read from the memory such that the picked up images are divided into a first picked up images group and a second picked up images group, the first group is displayed in real time at the display frame rate, the second group is recorded in a recording device, and after the second group is recorded, the first group is sorted in the sequential frame order and recorded.

12. An image pickup method, comprising:

outputting image signals of picked up images; and converting a frame rate of the image signals in a plurality of converting units by controlling writing the image signals output in the outputting step in a memory and reading the image signals written in the memory, wherein each of the image signals output in the outputting step are assigned to the plurality of converting units so that each of the image signals are arranged in order of sequential pixels when each of the image signals are read in the plurality of converting units, and a frame rate of the picked up images is higher than a recording frame rate used to record the picked up images in a recording medium or a display frame rate used to display the picked up images.

13. The image pickup method according to claim 12, wherein the outputting includes outputting the image signals of the picked up images in parallel in units of a plurality of sequential pixels and assigning the output image signals to the plurality of converting units.

14. The image pickup method according to claim 12, wherein the reading the image signals from the memory is performed in a sequential frame order of the picked up images, each of the converting units includes a memory control unit configured to thin the image signals read from the memory such that the picked up images are divided into a first picked up images group and a second picked up images group, the first group is displayed in real time at the display frame rate, the second group is recorded in a recording device, and after the second group is recorded, the first group is sorted in the sequential frame order and recorded.

* * * * *